(12) United States Patent
Maejima et al.

(10) Patent No.: US 11,458,762 B2
(45) Date of Patent: Oct. 4, 2022

(54) RAILWAY WHEEL

(71) Applicant: NIPPON STEEL CORPORATION, Tokyo (JP)

(72) Inventors: Taketo Maejima, Tokyo (JP); Manabu Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 226 days.

(21) Appl. No.: 16/493,159

(22) PCT Filed: Mar. 30, 2018

(86) PCT No.: PCT/JP2018/013537
§ 371 (c)(1),
(2) Date: Sep. 11, 2019

(87) PCT Pub. No.: WO2018/181861
PCT Pub. Date: Oct. 4, 2018

(65) Prior Publication Data
US 2020/0070569 A1      Mar. 5, 2020

(30) Foreign Application Priority Data

Mar. 31, 2017  (JP) .............................. JP2017-070999
Jan. 31, 2018  (JP) .............................. JP2018-014270

(51) Int. Cl.
*C22C 38/06*   (2006.01)
*B60B 17/00*   (2006.01)
(Continued)

(52) U.S. Cl.
CPC .......... *B60B 17/0006* (2013.01); *C21D 6/005* (2013.01); *C22C 38/001* (2013.01);
(Continued)

(58) Field of Classification Search
CPC ..................................................... C22C 38/06
See application file for complete search history.

(56) References Cited

U.S. PATENT DOCUMENTS 6,224,688 B1   5/2001   Takemura et al.
8,980,019 B2   3/2015   Ueda et al.
(Continued)

FOREIGN PATENT DOCUMENTS

CA       2451147 C       7/2013
CN       103717771 A     4/2014
(Continued)

OTHER PUBLICATIONS

English machine translation of JP 2004-315928 A of Ueda published Nov. 2004 (Year: 2004).*

*Primary Examiner* — Jophy S. Koshy
(74) *Attorney, Agent, or Firm* — Greer, Burns & Crain, Ltd.

(57) ABSTRACT

A railway wheel is capable of suppressing formation of pro-eutectoid cementite even if the C content is high. The railway wheel has a chemical composition consisting of: in mass %, C: 0.80 to 1.15%; Si: 0.45% or less; Mn: 0.10 to 0.85%; P: 0.050% or less; S: 0.030% or less; Al: 0.120 to 0.650%; N: 0.0030 to 0.0200%; Cr: 0 to 0.25%; and V: 0 to 0.12%, with the balance being Fe and impurities, wherein an amount of pro-eutectoid cementite, which is defined by Formula (1), in a microstructure of the railway wheel is not more than 1.50 pieces/100 μm:
Amount of pro-eutectoid cementite (pieces/100=a total sum of the number of pieces of pro-eutectoid cementite which intersect with two diagonal lines in a square visual field of 200 μm×200 μm/(5.66×100 μm) (1).

5 Claims, 10 Drawing Sheets

(51) Int. Cl.
  *C21D 6/00*   (2006.01)
  *C22C 38/00*  (2006.01)
  *C22C 38/02*  (2006.01)
  *C22C 38/04*  (2006.01)
  *C22C 38/24*  (2006.01)

(52) U.S. Cl.
  CPC .............. *C22C 38/02* (2013.01); *C22C 38/04* (2013.01); *C22C 38/06* (2013.01); *C22C 38/24* (2013.01); *B60B 2360/102* (2013.01); *C21D 2211/003* (2013.01)

(56) References Cited

U.S. PATENT DOCUMENTS

| | | |
|---|---|---|
| 2013/0243640 A1 | 9/2013 | Yamamoto et al. |
| 2014/0205855 A1 | 7/2014 | Kawata et al. |
| 2015/0147224 A1 | 5/2015 | Yamamoto et al. |
| 2017/0191149 A1 | 7/2017 | Kimura et al. |

FOREIGN PATENT DOCUMENTS

| | | | |
|---|---|---|---|
| CN | 106460117 A | | 2/2017 |
| JP | 09202937 A | | 8/1997 |
| JP | 1180897 A | | 3/1999 |
| JP | 2004315928 A | * | 11/2004 |
| JP | 2004315928 A | | 11/2004 |
| JP | 2012107295 A | | 6/2012 |
| JP | 2013231212 A | | 11/2013 |

* cited by examiner

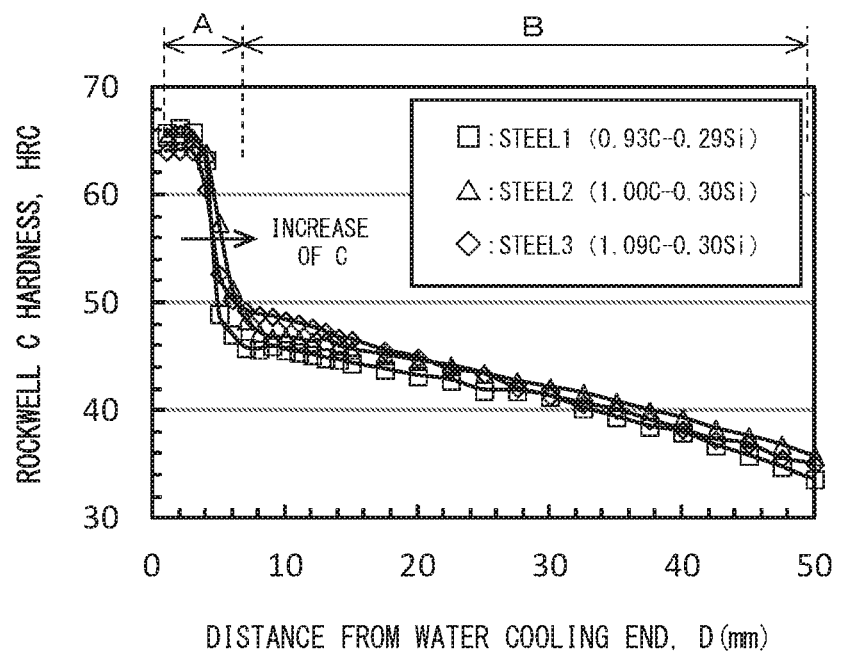

RAILWAY WHEEL

This is a National Phase Application filed under 35 U.S.C. § 371, of International Application No. PCT/JP2018/013537, filed Mar. 30, 2018, the contents of which are incorporated by reference.

TECHNICAL FIELD

The present invention relates to a railway wheel.

BACKGROUND ART

A railway vehicle travels on a rail constituting a railway track. A railway vehicle includes a plurality of railway wheels. The railway wheel supports the vehicle keeping in contact with the rail and moves on the rail while rotating thereon. The railway wheel wears due to the contact with the rail. In recent years, for the purpose of increasing the efficiency of railway transportation, attempts have been made to increase the loading weight on the railway vehicle, and increase the speed of the railway vehicle. As a result, there is a demand for improvement in wear resistance for railway wheels.

Technologies to improve wear resistance of a railway wheel have been proposed in Japanese Patent Application Publication No. 09-202937 (Patent Literature 1), Japanese Patent Application Publication No. 2012-107295 (Patent Literature 2), Japanese Patent Application Publication No. 2013-231212 (Patent Literature 3), and Japanese Patent Application Publication No. 2004-315928 (Patent Literature 4).

The railway wheel disclosed in Patent Literature 1 consists of, in mass %, C: 0.4 to 0.75%, Si: 0.4 to 0.95%, Mn: 0.6 to 1.2%, Cr: 0 to 0.2% or less, P: 0.03% or less, and S: 0.03% or less, with the balance being Fe and other inevitable impurities. In this railway wheel, a region from the surface of the wheel tread part to a depth of at least 50 mm is composed of a pearlite structure. The production method of a railway wheel of Patent Literature 1 includes a quenching step in which the wheel tread part is cooled in a condition that a cooling curve of the wheel tread part passes through a pearlite forming region in a continuous cooling transformation curve, and resides on the long-time side of the martensite transformation curve.

The wheel steel disclosed in Patent Literature 2 has a chemical composition consisting of, in mass %, C: 0.65 to 0.84%, Si: 0.02 to 1.00%, Mn: 0.50 to 1.90%, Cr: 0.02 to 0.50%, V: 0.02 to 0.20%, and S: 0.04% or less, with the balance being Fe and impurities, wherein P≤0.05%, Cu≤0.20%, and Ni≤0.20%, The chemical composition further satisfies the following relational formulae:

$$[34 \leq 2.7+29.5 \times C+2.9 \times Si+6.9 \times Mn+10.8 \times Cr+30.3 \times Mo+44.3 \times V \leq 43] \text{ and}$$

$$[0.76 \times \exp(0.05 \times C) \times \exp(1.35 \times Si) \times \exp(0.38 \times Mn) \times \exp(0.77 \times Cr) \times \exp(3.0 \times Mo) \times \exp(4.6 \times V) \leq 25]$$

Patent Literature 2 states that the steel for railway wheel achieves excellent wear resistance, rolling fatigue resistance, and spalling resistance by satisfying the above described chemical composition and the formulae.

The wheel steel disclosed in Patent Literature 3 consists of, in mass %, C: 0.65 to 0.84%, Si: 0.4 or less, Mn: 050 to 1.40%, Cr: 0.02 to 0.13%, S: 0.04% or less, V: 0.02 to 0.12%, with the balance being Fe and impurities, wherein Fill defined by Formula (1) is 32 to 43, and Fn2 defined by Formula (2) is 25 or less. Where, Formula (1) is $$Fn1=2.7+29.5C+2.9Si+6.9Mn+10.8Cr+30.3Mo+44.3V, \text{ and Formula (2) is } Fn2=\exp(0.76) \times \exp(0.05 \times C) \times \exp(1.35Si) \times \exp(0.38Mn) \times \exp(0.77Cr) \times \exp(3.0Mo) \times \exp(4.6V)$$

Patent Literature 3 states that the wheel steel achieves excellent wear resistance, rolling fatigue resistance, and spalling resistance when it has the above described chemical composition, and Fn1 and Fn2 satisfy the above described range.

The railway vehicle wheel disclosed in Patent Literature 4 is an integrated railway vehicle wheel composed of steel containing a chemical composition consisting of, in mass %, C: 0.85 to 1.20%, Si: 0.10 to 2.00%, Mn: 0.05 to 2.00%, and further as needed, a predetermined amount of one or more elements selected from Cr, Mo, V, Nb, B, Co, Cu, Ni, Ti, Mg, Ca, Al, Zr, and N, with the balance being Fe and other unavoidable impurities, wherein at least part of the tread and/or the flange surface of the wheel has a pearlite structure. Patent Literature 4 states that the life of the railway vehicle wheel depends on the amount of wear of the tread and the flange surface (paragraph [0002] of Patent Literature 4), and further depends on a crack in the tread and the flange surface which is caused by increase in calorific value when brake is applied in a high-speed railway. It also states that when the railway vehicle wheel has the above described configuration, it is possible to suppress wear and heat crack of the tread and the flange surface.

CITATION LIST

Patent Literature

Patent Literature 1: Japanese Patent Application Publication No. 09-202937
Patent Literature 2: Japanese Patent Application Publication No. 2012-107295
Patent Literature 3: Japanese Patent Application Publication No. 2013-231212
Patent Literature 4: Japanese Patent Application Publication No, 2004-315928

Non Patent Literature

Non Patent Literature 1: F. Wever et al., Zur Frage der Warmebehandlung der Stahle auf Grund ihrer Zeit-Temperatur-Umwandlungs-Schaubilder. Stahl u Eisen. 74 (1954), p 749 to 761

SUMMARY OF INVENTION

Technical Problem

In the railway vehicle wheel proposed in Patent Literature 1, the Cr content is held to be low and an appropriate amount of Si is contained to provide an appropriate hardenability and a property to facilitate obtaining a pearlite structure. However, the railway vehicle wheel according to Patent Literature 1 contains 0.4 to 0.75% of C, that is, the wheel is made of a so-called hypo-eutectoid steel. Therefore, there is limitation on improving wear resistance.

In the wheel steels proposed in Patent Literatures 2 and 3, the pearlite structure is strengthened by making V contained in a steel having a C content of 0.65 to 0.84%, thereby improving wear resistance. However, only containing V has its limitation on improvement of wear resistance.

On the other hand, in the railway vehicle wheel proposed in Patent Literature 4, wear resistance is improved by using a hyper-eutectoid steel in which the C content is increased.

By the way, one example of the production method of a railway wheel is as follows. A billet is subjected to hot working to form an intermediate product having a railway wheel shape. The formed intermediate product is subjected to heat treatment (tread quenching). In the tread quenching, the intermediate product is heated, and thereafter the tread and the flange part of the intermediate product are rapidly cooled. As a result of this, a fine pearlite which has high wear resistance is formed in the matrix structure of the near-surface portion of the tread. However, a quenched layer composed of martensite (or martensite and bainite) is formed in a layer above the fine pearlite of the near-surface portion of the tread after tread quenching. The quenched layer is likely to wear during use of a railway wheel. Therefore, after tread quenching, the quenched layer which has been formed at the outer most layer of the tread is removed by cutting such that fine pearlite is exposed to the tread. By the process steps described so far, a railway wheel is produced.

As described so far, a railway vehicle wheel made of a hyper-eutectoid steel has excellent wear resistance. However, when a railway wheel is produced by the above described production method by using a hyper-eutectoid steel, it has become clear that in contrast to hypo-eutectoid steel, pro-eutectoid cementite is likely to be formed in a railway wheel, for example, in a web part or a hub (boss) part of the railway wheel. The pro-eutectoid cementite deteriorates toughness of steel. Therefore, it is preferable to be able to suppress pro-eutectoid cementite from being formed in a railway wheel made of a hyper-eutectoid steel.

It is an object of the present invention to provide a railway wheel which can suppress pro-eutectoid cementite from being formed even if the C content is as high as 0.80% or more.

Solution to Problem

A railway wheel according to the present embodiment has a chemical composition consisting of, in mass %, C: 0.80 to 1.15%, Si: 0.45% or less, Mn: 0.10 to 0.85%, P: 0.050% or less, S: 0.030% or less, Al: 0.12.0 to 0.650%. N: 0.0030 to 0.0200%, Cr: 0 to 0.25%, and V: 0 to 0.12%, with the balance being Fe and impurities. In the microstructure, the amount of pro-eutectoid cementite defined by Formula (1) is not more than 1.50 pieces/100 μm.

Amount of pro-eutectoid cementite (pieces/100 μm)=a total sum of the number of pieces of pro-eutectoid cementite which intersect with two diagonal lines in a square visual field of 200 μm×200 μm/(5.66×100 μm)     (1)

The railway wheel according to the present embodiment may contain aluminum nitride of an average particle size of 150 nm or less in the microstructure.

Advantageous Effects of Invention

The railway wheel according to the present embodiment can reduce the amount of pro-eutectoid cementite even when the C content is high.

BRIEF DESCRIPTION OF DRAWINGS

FIG. 17 is a diagram illustrating a relationship between distances from the water cooling end and Rockwell hardness HRC obtained from the Jominy end-quenching test in Example 1.

DESCRIPTION OF EMBODIMENTS

[Configuration of Railway Wheel]

Figure 1:
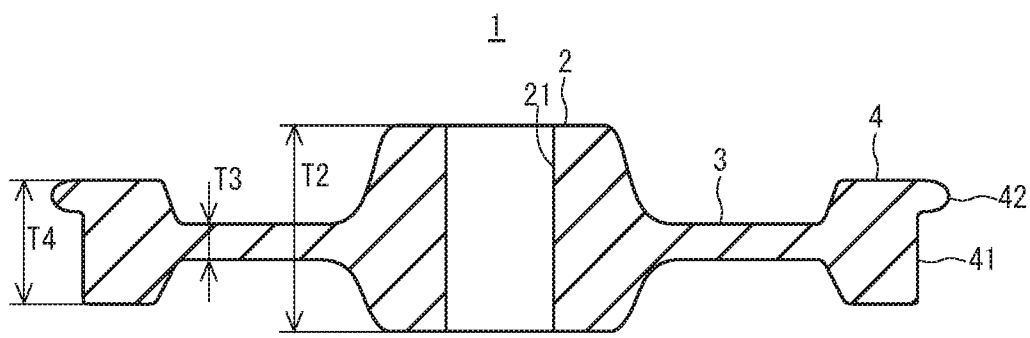
FIG. 1 is a cross sectional view in parallel with the center axis of a railway wheel.

FIG. 1 is a cross sectional view including a center axis of a railway wheel according to the present embodiment. Referring to FIG. 1, a railway wheel 1 has a disc shape and includes a hub part 2, a web part 3, and a rim part 4. The hub part 2 has a cylindrical shape and is disposed in the middle part in a radial direction (direction normal to the center axis) of the railway wheel 1. The hub part 2 has a through hole 21. The center axis of the through hole 21 corresponds to the center axis of the railway wheel 1. An axle shaft not shown is inserted into the through hole 21. A thickness T2 of the hub part 2 is larger than a thickness T3 of the web part 3. The rim part 4 is formed in an edge part in the outer circumference of the railway wheel 1. The rim part 4 includes a tread 41 and a flange part 42. The tread 41 is linked with the flange part 42. The tread 41 and the flange part 42 are in contact with the rail surface while the railway wheel 1 is being used. A thickness T4 of the rim part 4 is larger than the thickness T3 of the web part 3. The web part 3 is disposed between the hub part 2 and the rim part 4. The inner circumferential edge part of the web part 3 is linked with the huh part 2, and the outer circumference edge part of the web part 3 is linked with the rim part 4. The thickness T3 of the web part 3 is smaller than the thickness T2 of the huh part 2 and the thickness T4 of the rim part 4.

First, the present inventors have studied the chemical composition appropriate for improving wear resistance in a railway wheel. As a result, it was found that in a railway wheel, wear resistance as used as a railway wheel is improved better when hardness is increased by increasing the C content to be 0.80% or more than when hardness is increased by increasing the V content even if the same hardness is obtained. Though this mechanism is not clear, the following matters are considered. The tread of the railway wheel being used is subjected to external force (load) from the rail. By this external force, the cementite in the pearlite in the outer layer immediately below the tread is crushed, and the hardness is further increased by dispersion strengthening. Further, carbon in crushed fine cementite dissolves supersaturatedly into ferrite in the pearlite, thereby increasing the hardness of the outer layer immediately below the tread by solid-solution strengthening.

Increasing the C content in steel will result in increase in the volume fraction of cementite in pearlite, and further in that the pearlite is more likely to form finer lamella. In this case, the wear resistance of a railway wheel will be improved by the above described mechanism. In contrast to this, when V is contained in steel, the hardness of steel is increased by precipitation hardening of V carbonitride. In this occasion, since V carbonitride is formed in ferrite, it increases mostly the hardness of ferrite. That is, containment of V does not significantly affect refinement of pearlite. For that reason, although wear resistance can be improved to some extent by V containment, it cannot be improved as high as by dispersion strengthening by crushed cementite and solid-solution strengthening of C.

Then, the present inventors contemplated that to improve wear resistance, it is preferable to use a hyper-eutectoid steel having a C content of 0.80 to 1.15% in the chemical composition of railway wheel.

However, as a result of the study by the present inventors, it was found that in a railway wheel of a hyper-eutectoid steel having a C content of 0.80% or more, pro-eutectoid cementite is likely to be formed. Then, the present inventors investigated the relationship between the content of each element in the chemical composition and the amount of pro-eutectoid cementite in a railway wheel made of a hyper-eutectoid steel having a high C content. As a result, the following findings have been obtained.

Figure 2:
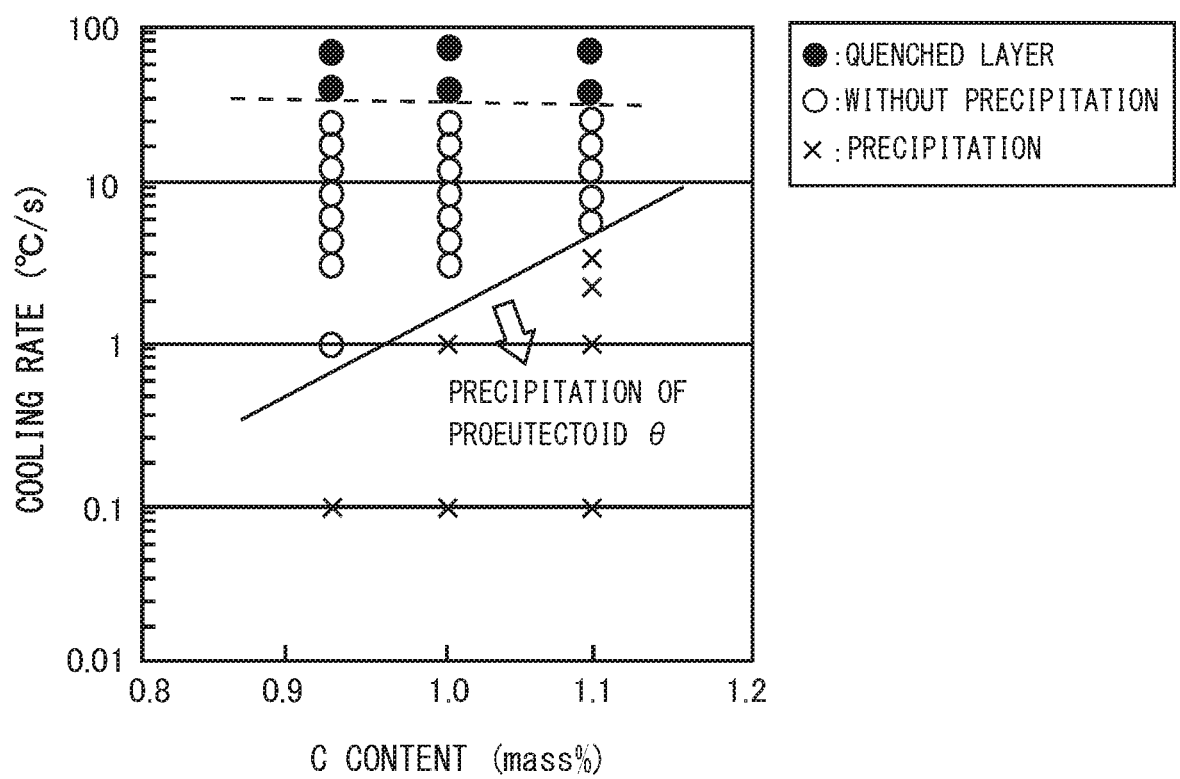
FIG. 2 is a diagram illustrating the relationship among the C content, the cooling rate, and the microstructure in steel, which are obtained by a Jominy end-quench test and a Formaster test.

FIGS. 2 to 7 are each a diagram illustrating the relationship among the content of each element in steel (FIG. 2: C content, FIG. 3: Si content, FIG. 4: Mn content, FIG. 5: Cr content, FIG. 6: Al content, FIG. 7: V content), average cooling rates in a range of 800 to 500° C., and pro-eutectoid cementite based on the results of heat treatment tests simulating heat treatment during the production process of railway wheel. The reason why the average cooling rate in a range of 800 to 500° C. is specified is that precipitation temperature of pro-eutectoid cementite is 800 to 500° C.

Figure 3:
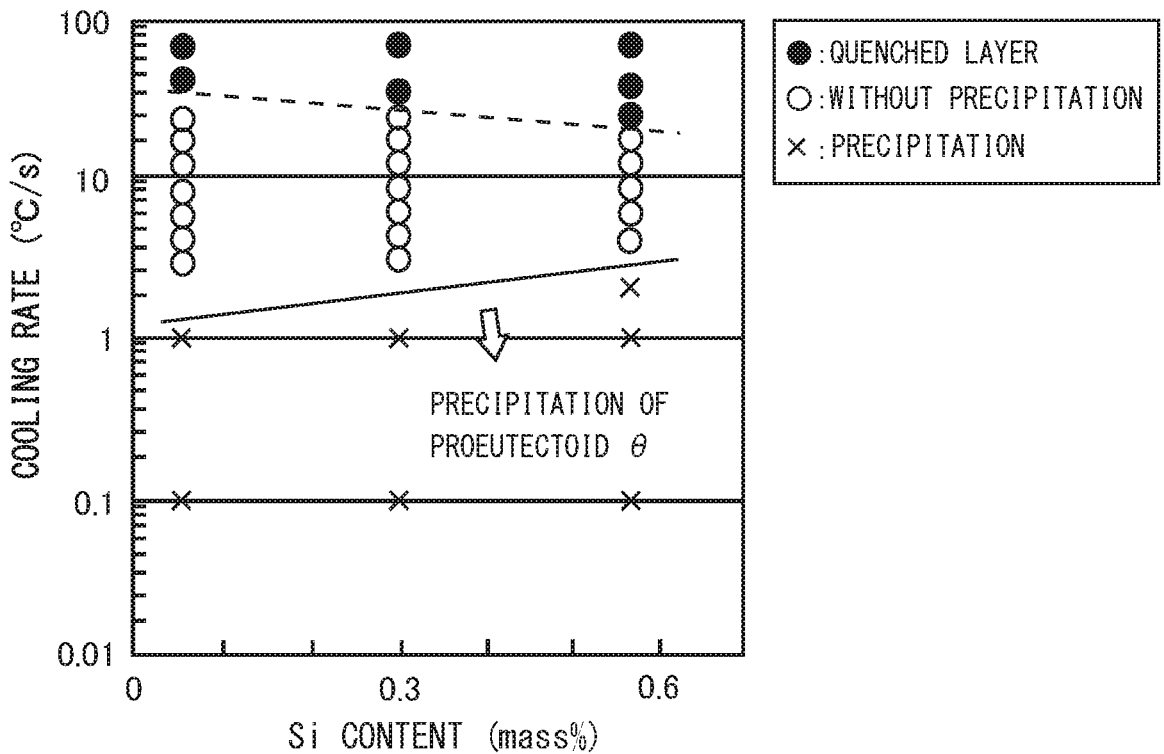
FIG. 3 is a diagram illustrating the relationship among the Si content, the cooling rate, and the microstructure in steel, which are obtained by the Jominy end-quench test and the Formaster test.
Figure 4:
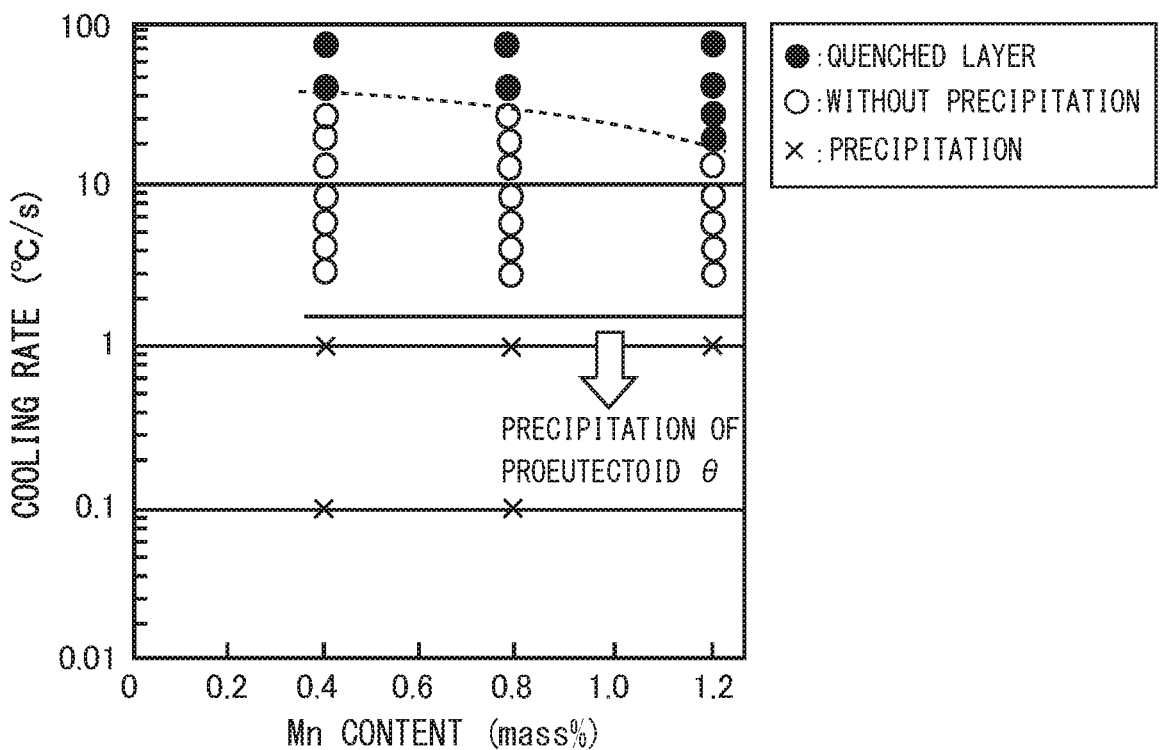
FIG. 4 is a diagram illustrating the relationship among the Mn content, the cooling rate, and the microstructure in steel, which are obtained by the Jominy end-quench test and the Formaster test.
Figure 5:
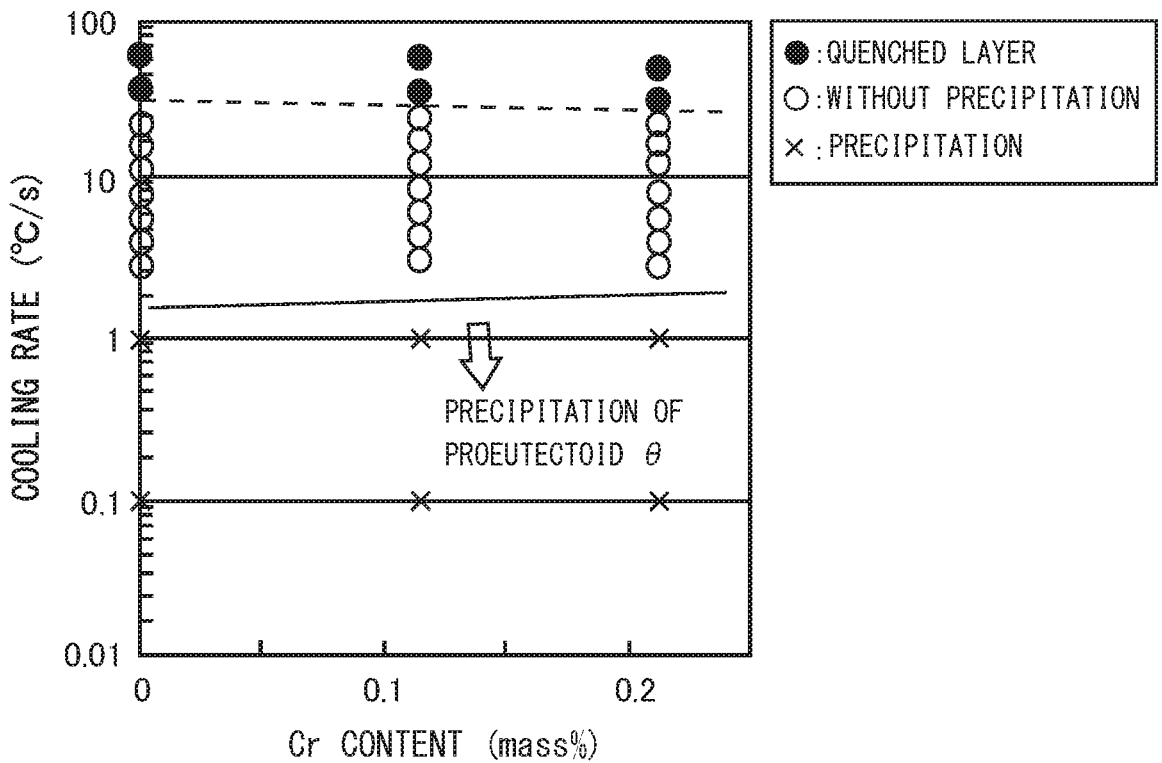
FIG. 5 is a diagram illustrating the relationship among the Cr content, the cooling rate, and the microstructure in steel, which are obtained by the Jominy end-quench test and the Formaster test.
Figure 6:
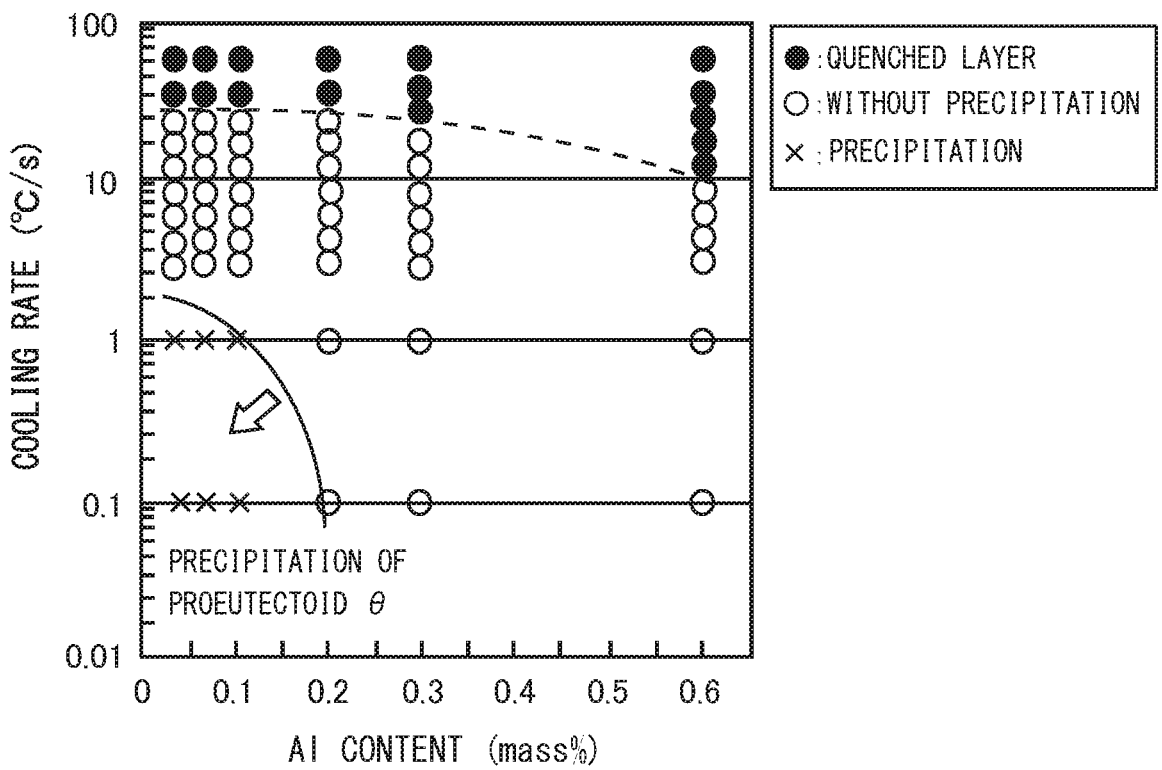
FIG. 6 is a diagram illustrating the relationship among the Al content, the cooling rate, and the microstructure in steel, which are obtained by the Jominy end-quench test and the Formaster test.
Figure 7:
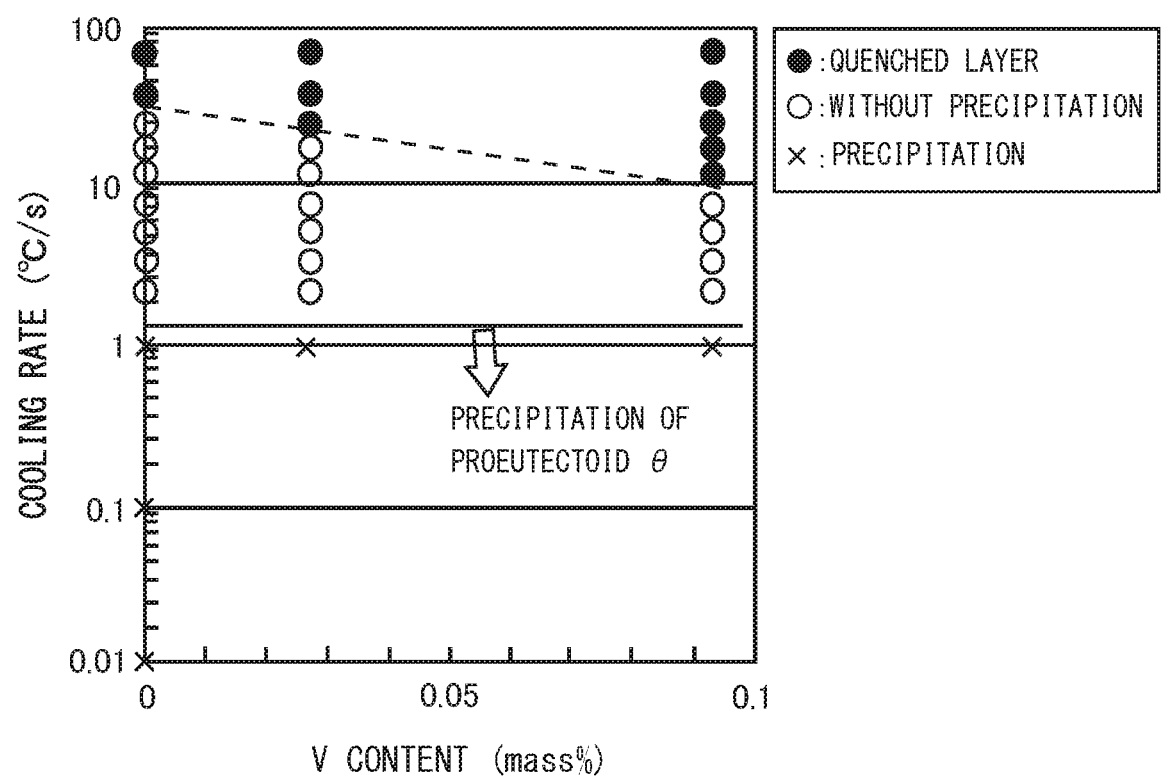
FIG. 7 is a diagram illustrating the relationship among the V content, the cooling rate, and the microstructure in steel, which are obtained by the Jominy end-quench test and the Formaster test.

Specifically, FIG. 2 is created based on the results obtained in a Jominy end-quench test and a Formaster test to be described later using a plurality of samples (Steel No. 1, 2, 3 of Example 1 to be described later) each having a chemical composition consisting of a substantially constant content of elements of Si: 0.29 to 0.30%, Mn: 0.79 to 0.80%, P: 0.001%, S: 0.002%, Al: 0.032 to 0.036%, and N: 0.0040 to 0.0042%, and a varying content of C, with the balance being Fe and impurities. FIG. 3 is created based on the results obtained in the Jominy end-quench test and the Formaster test to be described later using a plurality of samples (Steel No. 2, 4, 5 of Example 1 to be described later) each having a chemical composition consisting of a substantially constant content of elements of C: 1.00 to 1.03%, Mn: 0.80 to 0.81%, P: 0.001 to 0.002%, S: 0.001 to 0.002%, Al: 0.031 to 0.034%, N: 0.0040 to 0.0042%, and a varying content of Si, with the balance being Fe and impurities. FIG. 4 is created based on the results obtained in the Jominy end-quench test and the Formaster test to be described later using a plurality of samples (Steel No. 2, 7, 8 of Example 1 to be described later) each having a chemical composition consisting of a substantially constant content of elements of C: 1.00 to 1.04%, Si: 0.29 to 0.31%, P: 0.001 to 0.002%, S: 0.001 to 0.002%, Al: 0.030 to 0.034%, N: 0.0040 to 0.0058%, and a varying content of Mn, with the balance being Fe and impurities. FIG. 5 is created based on the results obtained in the Jominy end-quench test and the Formaster test to be described later using a plurality of samples (Steel No. 2, 9, 10 of Example 1 to be described later) each having a chemical composition consisting of a substantially constant content of elements of C: 1.00 to 1.05%, Si: 0.29 to 0.30%, Mn: 0.78 to 0.80%, P: 0.001%, S: 0.001 to 0.002%, Al: 0.033 to 0.034%, N: 0.0030 to 0.0040%, and a varying content of Cr, with the balance being Fe and impurities. FIG. 6 is created based on the results obtained in the Jominy end-quenCh test and the Formaster test to be described later using a plurality of samples (Steel No. 2, 11, 12, 13, 14, 15 of Example 1 to be described later) each having a chemical composition consisting of a substantially constant content of elements of C: 1.00 to 1.03%, Si: 0.29 to 0.30%, Mn: 0.79 to 0.81%, P: 0.001%, S: 0.001 to 0.002%, N: 0.0034 to 0.0046%, and a varying content of Al, with the balance being Fe and impurities. FIG. 7 is created based on the results obtained in the Jominy end-quench test and the Formaster test to be described later using a plurality of samples (Steel No. 2, 17, 18 of Example 1 to be described later) each having a chemical composition consisting of a substantially constant content of elements of C: 1.00 to 1.03%, Si: 0.29 to 0.30%, Mn: 0.80%, P: 0.001 to 0.002%, S: 0.001 to 0.002%, N: 0.0040 to 0.0048%, Al: 0.026 to 0.034%, and a varying content of V, with the balance being Fe and impurities.

The Jominy end-quench test was conducted in the following way. By using Jominy test specimens (round bar test specimen having a diameter of 25 mm and a length of 100 mm) having the above described chemical compositions, the Jominy end-quench test conforming to JIS G0561 (2011) was conducted. Specifically, a Jominy test specimen was held in a furnace of 950° C., which is temperature not less than the $A_{cm}$ transformation point, in the atmosphere for 30 minutes so that the structure of the Jominy test specimen was turned into austenite single phase. Thereafter, end-quenching (water cooling) was performed. Specifically, water was sprayed to cool one end of the Jominy test specimen.

After water cooling, the side face of the Jominy test specimen which had been subjected to water cooling was mechanically polished, and microstructure observation thereof was performed at a constant spacing from the one end (water cooling end) in the axial direction. The observation positions of the microstructure observation were arranged at a pitch of 1.0 mm from the water cooling end to a position of 15 mm, and at a pitch of 2.5 mm from the water cooling end to a position of not less than 15 mm.

Figure 8:
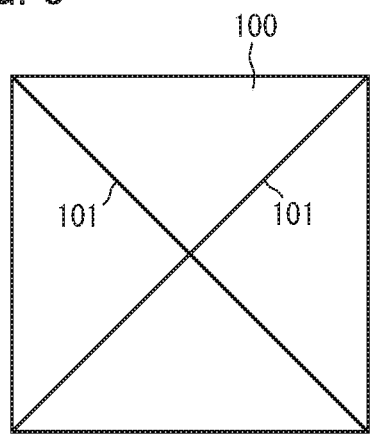
FIG. 8 is a schematic diagram for illustrating a measurement method of the amount of pro-eutectoid cementite.

A sample having a plane including the above described microstructure observation positions as an observation surface was prepared. The observation surface of each sample was minor finished by mechanical polishing. Thereafter, the observation surface was etched with a mixed solution of picnic acid and sodium hydroxide. A photographic image was produced for any one visual field (200 μm×200 μm) in the observation surface after etching by using an optical microscope with a magnification of 500. In the observation surface, pro-eutectoid cementite which is formed at a grain boundary of prior-austenite exhibited black color. For that reason, the presence or absence of pro-eutectoid cementite could be confirmed. When pro-eutectoid cementite was confirmed, the amount of pro-eutectoid cementite (its unit was pieces/100 μm, and it is hereinafter, also referred to as the amount of pro-eutectoid θ) was determined by the following method. As shown in FIG. 8, two diagonal lines were drawn in a square visual field of 200 μm×200 μm. Then, a total sum of the number of pieces of pro-eutectoid cementite that intersect with these two diagonal lines was determined. By dividing the determined total sum of pro-eutectoid cementite by a total length (5.66×100 μm) of the two diagonal lines, the amount of pro-eutectoid θ per 100 μm (pieces/100 μm) was determined, Next, the same observation surface was again mirror finished by mechanical polishing and etched with NITAL solution (mixed solution of nitric acid and ethanol) A photographic image was produced by using an optical microscope with a magnification of 500 for any one visual field (200 μm×200 μm) in the observation surface after etching. A quenched layer (martensite and/or bainite) and pearlite have different contrasts. Therefore, based on the contrast, the quenched layer and the pearlite in the observation surface were identified. The area fraction of pearlite was determined based on the total area of the identified pearlite and the area of the observation surface. And when any quenched layer was confirmed, it was determined that a quenched layer was formed.

Note that the relationship between the distance from the water cooling end during Jominy test and the cooling time from 800 to 500° C. is experimentally shown in Non Patent Literature 1 (F. Weyer et al., Zur Frage der Warmebehandlung der Stahle auf Grund ihrer Zeit-Temperatur-Umwandlungs-Schaubilder, Stahl u Eisen, 74 (1954), p 749 to 761). Based on the literature, distance from the water cooling end was converted to obtain an average cooling rate (° C./sec) from 800 to 500° C. at each position.

A case in which the cooling rate is not more than 1° C./sec cannot be reproduced by the Jominy end-quench test. Then, for a case in which the cooling rate is not more than 1° C./sec, a continuous cooling test (Formaster test) at a low cooling rate was conducted. A Formaster tester manufactured by Fuji Electronic Industrial Co., Ltd was used for heat treatment. Specifically, each test specimen was held at 950° C. for 5 minutes. Thereafter, each test specimen was cooled at a constant cooling rate of 1.0° C./sec (or 0.1° C./sec). Microstructure observation was conducted by the above described method on the test specimen after cooling. Then, when pro-eutectoid cementite was confirmed, the amount of pro-eutectoid θ was determined by the above described method. Based on the results obtained in the methods described so far, FIGS. 2 to 7 were created.

The symbol "○" in FIGS. 2 to 7 indicates that the microstructure is substantially composed of pearlite, and the amount of pro-eutectoid θ in the microstructure is not more than 1.50 pieces/100 μm. The symbol "×" means that although no quenched layer was formed in the microstructure, and the microstructure is substantially composed of pearlite, the amount of pro-eutectoid θ was more than 1.50 pieces/100 μm. Note that the phrase "the microstructure is substantially composed of pearlite" means that the area fraction of pearlite in the microstructure is not less than 95%. Moreover, the symbol "●" means that martensite and/or bainite (hereinafter, martensite and/or bainite is also referred to as a quenched layer) was formed.

A maximum cooling rate (cooling rate at a boundary between the symbol "○" and the symbol "×" in the figure) at which the amount of pro-eutectoid θ is formed more than 1.50 pieces/100 μm is defined as a critical cooling rate of pro-eutectoid cementite. The critical cooling rate of pro-eutectoid cementite is shown by a solid line in FIGS. 2 to 7.

In FIG. 2, as the C content increases, the critical cooling rate of pro-eutectoid cementite increases. Moreover, in FIGS. 3, 4, 5, and 7, Si, Mn, Cr, and V each have small effect on the critical cooling rate of pro-eutectoid cementite compared with C and Al.

On the other hand, referring to FIG. 6, as the Al content increases, the critical cooling rate of pro-eutectoid cementite remarkably decreases, resulting in remarkable decrease in the amount of pro-eutectoid θ. Therefore, regarding the amount of pro-eutectoid θ in steel, while C has effect of increasing the amount of pro-eutectoid θ, Al has effect of remarkably decreasing the amount of pro-eutectoid θ.

Based on the results of investigation described so far, the present inventors contemplated that in a railway wheel of hyper-eutectoid steel having a C content of about 0.80 to 1.15%, increasing the Al content would make it possible to suppress the amount of pro-eutectoid θ in a web part and a hub part in which cooling rate is low during heat treatment in the production process of railway wheel, and thereby to obtain excellent toughness even in a railway wheel of a hyper-eutectoid steel. Then, based on the above described investigation results, they have further investigated the chemical composition of the railway wheel of hyper-eutectoid steel to find for the first time that if the chemical composition of the railway wheel was chemical composition consisting of, in mass %, C: 0.80 to 1.15%, Si: 0.45% or less, Mn: 0.10 to 0.85%, P: 0.050% or less, S: 0.030% or less, Al: 0.120 to 0.650%, N: 0.0030 to 0.0200%, Cr: 0 to 0.25%, and V: 0 to 0.12%, with the balance being Fe and impurities, the amount of pro-eutectoid θ can be held not more than 1.50 pieces/100 μm even in the web part and the hub part, where cooling rate is low.

Note that referring to FIG. 6, as the Al content increases, quenched layer (symbol "●" in the figure) is likely to be formed at the time of tread quenching. In this case, yield tends to decrease in the production process. Therefore, in the viewpoint of suppressing formation of quenched layer, the upper limit of the Al content is preferably 0.350% in the above described chemical composition. However, for the purpose of suppressing precipitation of pro-eutectoid cementite and thereby improving toughness, the Al content may be more than 0.350%, and up to 0.650%.

[Refining of Prior-Austenite]

As described above, as an art of suppressing the amount of pro-eutectoid cementite in a railway wheel made of a hyper-eutectoid steel having a C content of 0.80 to 1.15%, it is effective to increase the Al content to 0.120 to 0.650%. However, as a result of further investigation by the present inventors, it was found that when the Al content is increased, coarse AlN may be formed in a railway wheel. The coarse AlN does not contribute to suppress grain growth of prior-austenite grain during heating at the time of tread quenching. The finer the prior-austenite grain is, the further toughness is improved. Therefore, when considering further improvement of toughness, finer prior-austenite grain is preferable.

Figure 9:
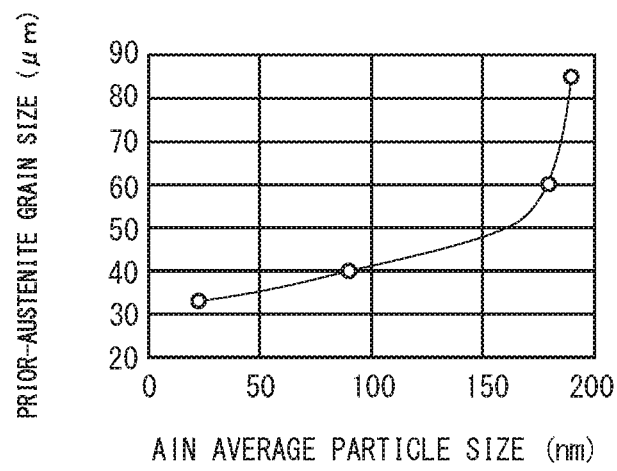
FIG. 9 is a diagram illustrating the relationship between the average particle size of AlN and prior-austenite grain size after the production process of the railway wheel of the present embodiment.

The present inventors have investigated further refining of prior-austenite grain in a railway wheel made of a hyper-eutectoid steel having a high Al content. As a result, they have found that as shown in FIG. 9, if an average particle size of AlN in the microstructure is 150 nm or less in a railway wheel made of a hyper-eutectoid steel having the above described chemical composition, the prior-austenite grain size can be refined to not more than 50 μm. Hereinafter, this point will be described.

Figure 10:
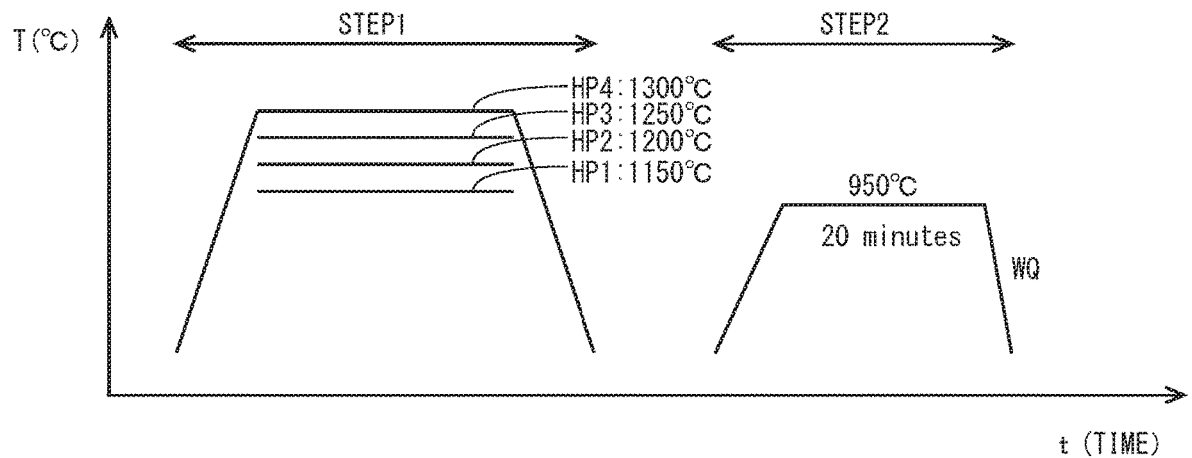
FIG. 10 is a schematic diagram for illustrating heat patterns of a hot-forging simulated heating step (STEP 1) and a tread quenching simulated step (STEP 2), which simulate the production process of railway wheel.

A plurality of test specimens (a disc having a diameter of 40 mm and a thickness of 20 mm) having the chemical composition of Steel 14 in Table 1 to be described below were prepared. Referring to FIG. 10, a hot-forging simulated heating step (STEP 1) was performed on the test specimens simulating the production process of a railway wheel. In this occasion, in each test specimen, holding temperature in a furnace was 1150° C. (HP1), 1200° C. (HP2), 1250° C. (HP3), and 1300° C. (HP4). The in-furnace atmosphere was argon gas atmosphere, and holding time was 60 minutes for each test specimen. The test specimen was allowed to cool after elapse of the holding time.

After the hot-forging simulated heating step (STEP 1), a tread quenching simulated step (STEP 2) was performed. In the tread quenching simulated step, the in-furnace temperature was 950° C. for every test specimen and was held for 20 minutes. After elapse of the holding time, water quenching (WQ) was performed.

For each of the test specimen after STEP 1 and before STEP 2, and the test specimen after STEP 2, average particle size (nm) of AlN was determined by the method to be described below.

Further, to measure prior-austenite grain size, the following test was conducted. In the present chemical composition, it is difficult to distinguish a prior-austenite grain boundary after tread quenching processing. Therefore, they contrived a better way to measure the prior-austenite grain size by causing pro-eutectoid cementite to precipitate at prior-austenite grain boundaries during cooling in the tread quenching simulated step. Specifically, the above described test specimen was subjected to the hot-forging simulated heating step (STEP 1) and the tread quenching simulated step (STEP 3) shown in FIG. 11. The hot-forging simulated heating step (STEP 1) of FIG. 11 was the same as the hot-forging simulated heating step (STEP 1) of FIG. 10. The tread quenching simulated step (STEP 3) of FIG. 11 differed only in the cooling method compared to the tread quenching simulated step (STEP 2) of FIG. 10. Specifically, in the tread quenching simulated step (STEP 3) of FIG. 11, the test specimen after being held at 950° C. for 20 minutes was immersed in salt bath of 675° C. and isothermally maintained at 675° C. for 30 minutes. As a result of this, pro-eutectoid cementite was caused to precipitate at prior-austenite grain boundaries so that the prior-austenite grain was able to be confirmed by microstructure observation. The test specimen after being isothermally maintained was allowed to cool to a room temperature (25° C.). The prior-austenite grain size of the test specimen having been subjected to the heat treatment of STEP 1 and STEP 3 was determined by a measurement method to be described below.

Figure 12:
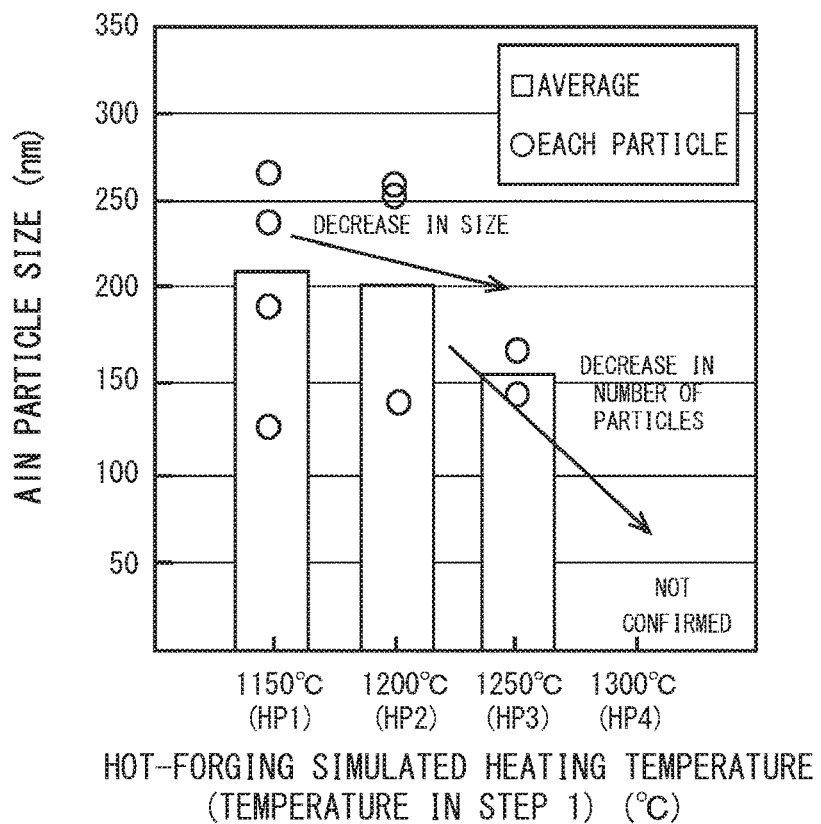
FIG. 12 is a diagram illustrating a relationship between the hot-forging simulated heating temperature and the particle size and average particle size of each AlN in steel in a test specimen after. STEP 1 and before STEP 2 shown in FIG. 10.
Figure 13:
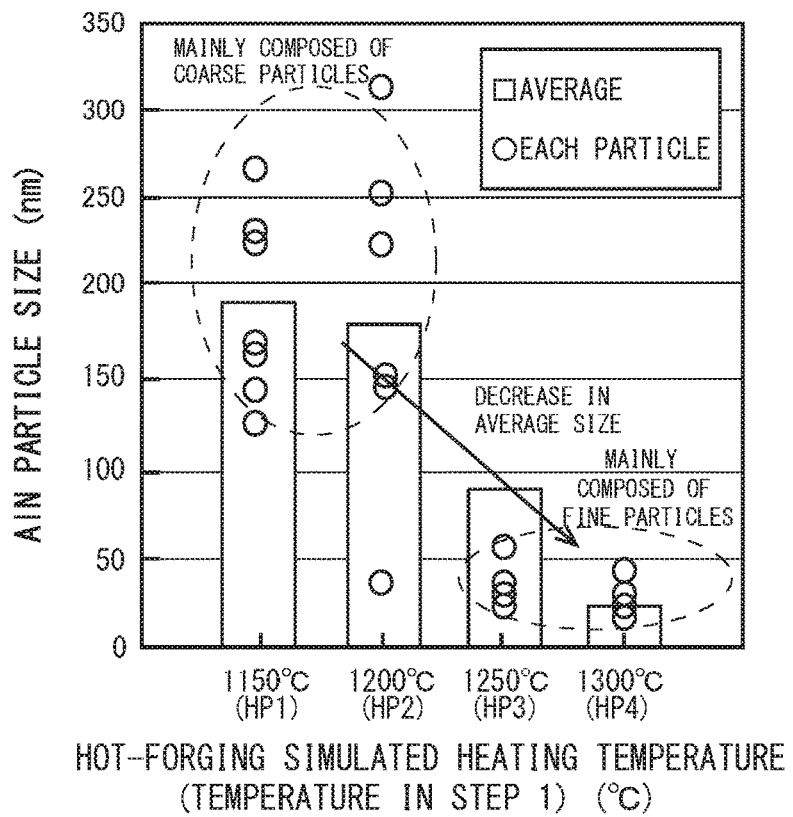
FIG. 13 is a diagram illustrating a relationship between a hot-forging simulated heating temperature and a particle size and an average particle size of each AlN in steel in a test specimen after STEP 2 shown in FIG. 10.
Figure 14:
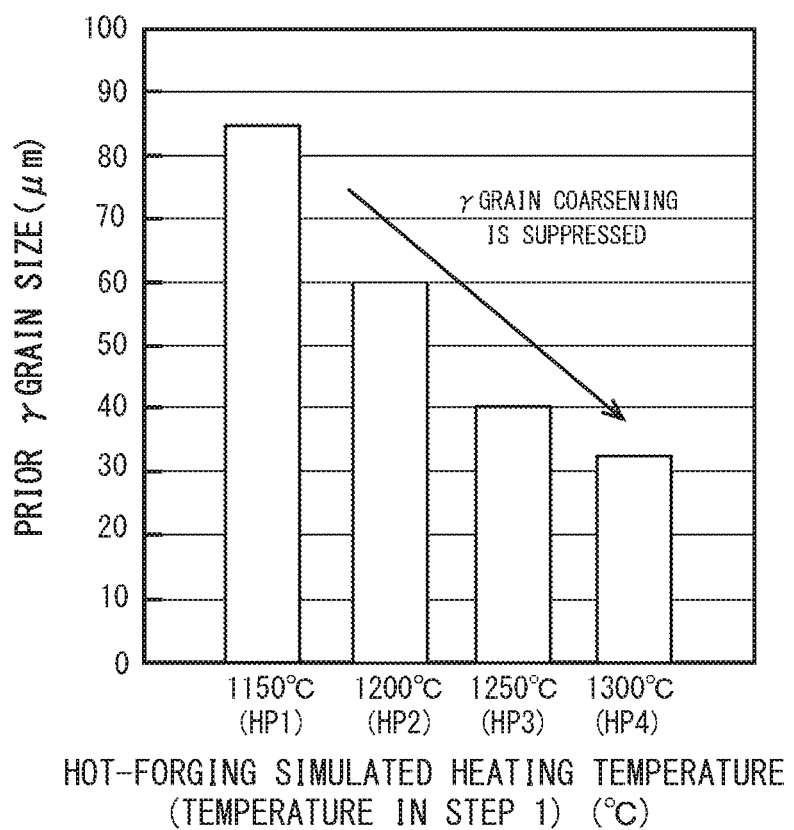
FIG. 14 is a diagram illustrating a relationship between a hot-forging simulated heating temperature and a prior-austenite grain size (prior γ grain size) of a test specimen after STEP 3 shown in FIG. 11.

FIG. 12 is a diagram to illustrate an average particle size of AlN for each hot-forging simulated heating temperature (HP1 to HP4) in the test specimen after the hot-forging simulated heating step (STEP 1) and before the tread quenching simulated step (STEP 2). FIG. 13 is a diagram to illustrate an average particle size of AlN for each hot-forging simulated heating temperature (HP1 to HP4) in the test specimen after the tread quenching simulated step (STEP 2). FIG. 14 is a diagram to illustrate prior-austenite grain size for each hot-forging simulated heating temperature (HP1 to HP4) in the test specimen after the tread quenching simulated step (STEP 3).

The symbol "○" in FIGS. 12 and 13 indicates a measured value of grain size of AlN confirmed in each observation visual field at each HP1 to HP4, and a bar graph at each HP means an average particle size of AlN measured at each HP. Referring to FIGS. 12 and 13, when the hot-forging simulated heating temperature was not more than 1200° C., AlN did not fully dissolve after the hot forging step and before the tread quenching step (FIG. 12), and a large amount of AlN remained. Therefore, a large number of coarse AlN remained after heating in the tread quenching step (FIG. 13) and the average particle size also remained to be as coarse as more than 150 nm.

In contrast to this, when the hot-forging simulated heating temperature was more than 1200° C. (HP3 and HP4), the AlN residual amount (FIG. 12) after the hot forging step decreased, and when it was more than 1250° C., AlN fully dissolved. Then, after the heating in the tread quenching step (FIG. 13), a large number of fine AlN precipitated and the average particle size became 150 nm or less. Further, referring to FIGS. 13 and 14, as the average particle size of AlN became finer, the prior-austenite grain size decreased as well.

FIG. 9 shows a summary of FIGS. 13 and 14, that is, a relationship between the average particle size of AlN after the tread quenching simulated step and the prior-austenite grain size. Referring to FIG. 9, as the average particle size of AlN in steel decreased, the prior-austenite grain size remarkably decreased. Then, when the average particle size of AlN became 150 nm or less, the degree of decrease of prior-austenite grain size associated with decrease in the average particle size of AlN decreased. That is, the prior-austenite grain size had an inflection point in the vicinity of an average particle size of AlN of 150 nm. Then, when the average particle size of AlN was 150 nm or less, the prior-austenite grain size was sufficiently refined to 50 μm or less.

Note that based on the above described findings, the present inventors confirmed improvements in toughness of railway wheel associated with refining of AlN and refining of prior-austenite grain in the following test.

Figure 15:
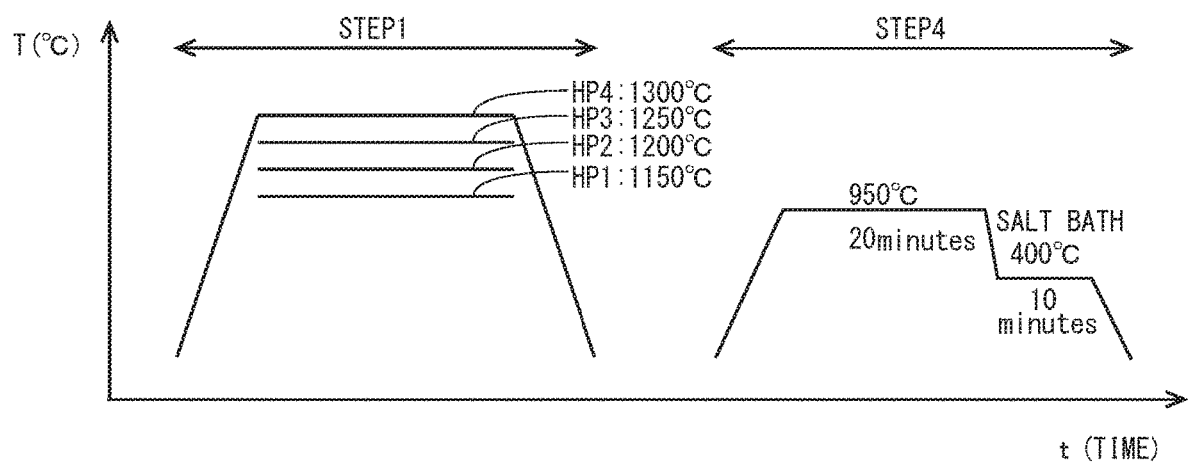
FIG. 15 is a schematic diagram for illustrating heat patterns of the hot-forging simulated heating step (STEP 1) and a tread quenching simulated step (STEP 4), which simulate the production process of railway wheel different from FIG. 10.

Specifically, as in the tests of FIGS. 12 and 13, a plurality of Charpy test specimens (10 mm×10 mm×55 mm) having a chemical composition of Steel 14 of an example to be described later were prepared. These test specimens were subjected to the hot-forging simulated heating step (STEP 1) and the tread quenching simulated step (STEP 4) shown in FIG. 15. The hot-forging simulated heating step (STEP 1) of FIG. 15 was the same as the hot-forging simulated heating step (STEP 1) of FIGS. 10 and 11. The tread quenching simulated step (STEP 4) of FIG. 15 was set assuming that the test specimen was cooled at a cooling rate at which a rim part would be cooled in the tread quenching of a real railway wheel. Specifically, in the tread quenching simulated step (STEP 4) of FIG. 15, the test specimen after being held at 950° C. for 20 minutes was immersed in a salt bath of 400° C. and isothermally maintained at 400° C. for 10 minutes. Then, the test specimens after being isothermally maintained were allowed to cool to a room temperature (25° C.). Using the Charpy test specimens which had been subjected to the above described heat treatments of STEP 1 and STEP 4, a Charpy impact test conforming to JIS Z 7742(2005) was conducted at a room temperature (25° C.).

Figure 16:
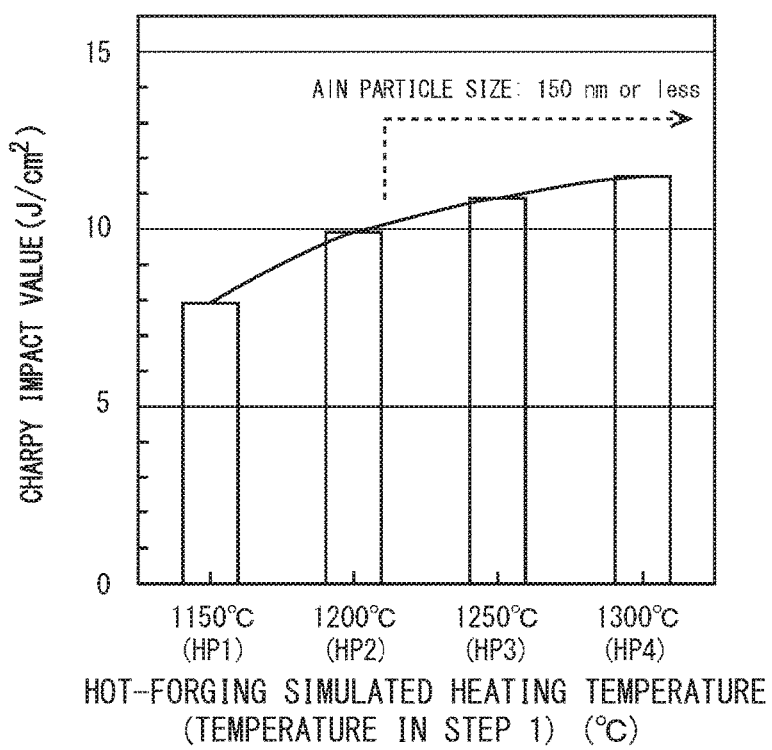
FIG. 16 is a diagram illustrating a relationship between hot-forging simulated heating temperature and Charpy impact values (J/cm$^2$) in a test specimen after STEP 4 shown in FIG. 15.

FIG. 16 is a diagram to illustrate results of the Charpy impact test. The abscissa indicates each hat-forging simulated heating temperature (HP1 to HP4) and the ordinate indicates Charpy impact values (J/cm$^2$). Bar graphs in the figure show averages of Charpy impact values (J/cm$^2$) obtained by a plurality (one to four) of Charpy test specimens at each HP1 to HP4.

Referring to FIG. 16, as the hot-forging simulated heating temperature increases, the Charpy impact value steeply increases. Then, when the hot-forging simulated heating temperature is more than 1200° C., a rise of the Charpy impact value associated with an increase in the hot-forging simulated heating temperature becomes smaller than the case of the temperature being not more than 1200° C. in other words, if the average particle size of AlN is 150 nm or less, the toughness of a railway wheel having the above described chemical composition can be further improved.

As described so far, if the average particle size of AlN is 150 nm or less, the prior-austenite grain will be sufficiently refined, and as a result, the toughness of railway wheel is considered to be further improved. However, even if the average particle size of AlN is more than 150 nm, as described above, if the amount of pro-eutectoid cementite is not more than 1.50 pieces/100 µm, toughness effective in a railway wheel can be obtained.

To make the average particle size of AlN not more than 150 nm, for example, the heating temperature during hot forging processing may be made 1220° C. or more. In this case, a majority of AlN in steel dissolves during hot forging. Then, during heating in the tread quenching step, fine AlN whose average particle size is 150 nm or less precipitates. Owing to pinning effects by fine AlN, coarsening of prior-austenite grain is suppressed resulting in refining of prior-austenite grain. As a result, toughness of railway wheel is considered to be further improved.

A railway wheel of the present embodiment, which has been completed based on the above described findings, has a chemical composition consisting of, in mass %, C: 0.80 to 1.15%, Si: 0.45% or less, Mn: 0.10 to 0.85%, P: 0.050% or less, S: 0.030% or less, Al: 0.120 to 0.650%, N: 0.0030 to 0.0200%, Cr: 0 to 0.25%, and V: 0 to 0.12%, with the balance being Fe and impurities. In the microstructure of the railway wheel, the amount of pro-eutectoid cementite defined by Formula (I) is not more than 1.50 pieces/100 µm.

Amount of pro-eutectoid cementite (pieces/100 µm)=a total sum of the number of pieces of pro-eutectoid cementite which intersect with two diagonal lines in a square visual field of 200 µm×200 µm/(5.66×100 µm)  (1)

The railway wheel according to the present embodiment may contain AlN of an average particle size of 150 nm or less in the microstructure.

In such a case, the prior-austenite grain is refined due to fine AlN. As a result, the toughness of railway wheel is further improved.

The chemical composition of the above described railway wheel may contain Al: 0.120 to 0.350%. Moreover, the chemical composition of the above described railway wheel may contain one or more elements selected from the group consisting of Cr: 0.02 to 0.25% and V: 0.02 to 0.12%.

Hereinafter, a railway wheel of the present embodiment will be described in detail. In the present description, the symbol "%" regarding elements means, unless otherwise stated, mass %.

[Chemical Composition of Railway Wheel]

The chemical composition of a railway wheel of the present embodiment contains the following elements.

C: 0.80 to 1.15%

Carbon (C increases the hardness of steel and increases the wear resistance of a railway wheel. If the C content is too low, this effect cannot be obtained. On the other hand, if the C content is too high, much pro-eutectoid cementite precipitates at prior-austenite grain boundaries. In this case, the toughness of the railway wheel deteriorates. Therefore, the C content is 0.80 to 1.15%. The lower limit of the C content is preferably 0.90%, and more preferably 0.95%. The upper limit of the C content is preferably 1.10%, more preferably 1.05%.

Si: 0.45% or less

Silicon (Si) is inevitably contained. That is, the Si content is more than 0%. Si solid-solution strengthens ferrite to increase the hardness of steel. However, if the Si content is too high, pro-eutectoid cementite, which causes deterioration of the toughness of steel, becomes likely to be formed. If the Si content is too high, the hardenability of steel becomes too high, and martensite becomes likely to be formed. In such a case, the thickness of the quenched layer formed on the tread at the time of tread quenching increases. As a result, the quenched layer is removed by cutting. Therefore, when the quenched layer is thick, the amount of cutting increases and the yield decreases. When the Si content is too high, then, quenching is caused by friction heat generated between the wheel and the brake pad during use of the railway wheel, in such a case, crack resistance of railway wheel may deteriorate. Therefore, the Si content is 0.45% or less. The upper limit of the Si content is preferably 0.35%, and more preferably 0.25%. The lower limit of the Si content is, though not particularly limited, for example 0.05%.

Mn: 0.10 to 0.85%

Manganese (Mn) solid-solution strengthens ferrite to increase the hardness of steel. Mn further forms MnS to improve the machinability of steel. If the Mn content is too low, these effects cannot be obtained. On the other hand, if the Mn content is too high, the hardenability of steel becomes too high. In such a case, the thickness of the quenched layer increases, and the yield in the production process decreases. Further, quenching may be caused by friction heat generated between the wheel and the brake pad during use of the railway wheel, thereby deteriorating crack resistance of steel. Therefore, the Mn content is 0.10 to 0.85%. The lower limit of the Mn content is preferably 0.50%, and more preferably 0.70%. The upper limit of the Mn content is preferably 0.82%.

P: 0.050% or less

Phosphorus (P) is an inevitably contained impurity. That is, the P content is more than 0%. P segregates at grain boundaries to deteriorate the toughness of steel. Therefore, the P content is 0.050% or less. The upper limit of the P content is preferably 0.030%, and more preferably 0.020%. The P content is preferably as low as possible. However, excessively reducing the P content will result in excessive increase in the refining cost. Therefore, in consideration of ordinary industrial manufacturing, the lower limit of the P content is preferably 0.0001%, and more preferably 0.0005%.

S: 0.030% or less

Sulfur (S) is inevitably contained. That is, the S content is more than 0% S forms MnS and enhances the machinability of steel. On the other hand, if the S content is too high, the toughness of steel deteriorates. Therefore, the S content is 0.030% or less. The upper limit of the S content is preferably 0.020%. The lower limit of the S content for enhancing the machinability is preferably 0.005%.

Al: 0120 to 0.650%

Aluminum (Al) suppresses formation of pro-eutectoid cementite which causes deterioration of the toughness of steel. Further. Al combines with N to form AlN, and relines the prior-austenite grains. As the prior-austenite grains become liner, the toughness of steel further improves. These effects cannot be obtained if the Al content is too low. However, if the Al content is too high, AlN coarsens and does not dissolve at the heating temperature during hot working. Therefore, the grain growth effect of prior-austenite grains during heating at the time of tread quenching is not exhibited, and the toughness of railway wheel deteriorates. Therefore, the Al content is 0.120 to 0.650%. The lower limit of the Al content is preferably 0.150%, and more preferably 0.250%. The upper limit of the Al content is preferably 0.630%, more preferably 0.500%, still more preferably 0.550%, and still more preferably 0.500%. In consideration of reduction of the amount of cutting of the quenched layer after the tread quenching, the upper limit of the Al content is preferably 0.350%, more preferably 0.320%, and still more preferably 0.300%. The Al content as used herein means the content of acid-soluble Al (sol. Al).

N: 0.0030 to 0.0200%

Nitrogen (N) combines with Al to form AlN and refines prior-austenite grains. As prior-austenite grains are refined, the toughness of steel is improved. If the N content is too low, this effect cannot be obtained. On the other hand, if the N content is too high, such effect is saturated. Therefore, the N content is 0.0030 to 0.0200%. The lower limit of the N content is preferably 0.0035%, and more preferably 0.0040%. The upper limit of the N content is preferably 0.0100%, and more preferably 0.0080%.

The balance of the chemical composition of the railway wheel according to the present embodiment consists of Fe and impurities. Where, an impurity means an element, which is introduced from ores and scraps as the raw material, or from a production environment, etc. when the above described railway wheel is industrially produced, and which is permitted within a range not adversely affecting the railway wheel of the present embodiment.

The chemical composition of the railway wheel of the present embodiment may also contain Cr in place of part of Fe.

Cr: 0 to 0.25%

Chromium (Cr) is an optional element and may not be contained. That is, the Cr content may be 0%. When contained, Cr decreases the lamellar spacing of pearlite. This significantly increases the hardness of pearlite. However, if the Cr content is too high, the hardenability improves, and the thickness of the quenched layer after tread quenching increases excessively. Therefore, the Cr content is 0 to 0.25%. The upper limit of the Cr content is preferably 0.22%. The lower limit of the Cr content is preferably more than 0%. The preferable lower limit of the Cr content to more effectively obtain the effect of reducing the lamellar spacing of pearlite is 0.02%.

The chemical composition of a railway wheel of the present embodiment may also contain V in place of part of Fe.

V: 0 to 0.12%

Vanadium (V) is an optional element and may not be contained. That is, the V content may be 0%. When contained, V forms any of carbide, nitride and carbonitride, thereby precipitation strengthening steel. As a result, the hardness of railway wheel is significantly increased to further enhance wear resistance. However, if the V content is too high, the hardenability becomes high, and the thickness of the quenched layer after tread quenching increases excessively. Therefore, the V content is 0 to 0.12%. The upper limit of the V content is preferably 0.10%. The lower limit of the V content is preferably more than 0%, more preferably 0.02%, and still more preferably 0.03%.

[Amount of Pro-Eutectoid Cementite]

The railway wheel according to the present embodiment has a microstructure in which the amount of pro-eutectoid cementite (amount of pro-eutectoid θ defined by Formula (1) is not more than 1.50 pieces/100 μm.

Amount of pro-eutectoid θ (pieces/100 μm)=a total sum of the number of pieces of pro-eutectoid cementite which intersect with two diagonal lines in a square visual field of 200 μm×200 μm/(5.66×100 μm) (1)

To be more specific, the amount of pro-eutectoid θ defined by Formula (1) is not more than 1.50 pieces/1.00 μm in the rim part of the railway wheel of the present embodiment, the amount of pro-eutectoid cementite defined by Formula (I) is not more than 1.50 pieces/100 μm in the web part, and the amount of pro-eutectoid cementite defined by Formula (1) is not more than 1.50 pieces/100 μm in the hub part.

As described above, when the amount of pro-eutectic θ is large, the toughness of railway wheel deteriorates. The railway wheel of the present embodiment contains 0.120 to 0.650% of Al. In the case of the above-described chemical composition of the hyper-eutectoid steel, by containing 0.120 to 01650% of Al, the amount of pro-eutectoid θ is reduced in the railway wheel after the tread quenching step in the production process to be held not more than 1.50 pieces/100 μm. The upper limit of the amount of pro-eutectic θ is preferably 1.20 pieces/100 μm, and more preferably 1.00 pieces/100 μm.

The amount of pro-eutectoid θ is measured by the following method. Samples are taken from each of a central position in the thickness direction of the rim part, a central position in the thickness direction of the web part, and a central position in the thickness direction of the hub part of the railway wheel. The observation surface of each sample is mirror-finished by mechanical polishing. Thereafter, the observation surface is etched with a mixed solution of picnic acid and sodium hydroxide. A photographic image is produced for any one visual field (200 μm×200 μm) in the observation surface after etching by using an optical microscope with a magnification of 500. In the observation surface, pro-eutectoid cementite which is formed at a prior-austenite grain boundary exhibits black color. Therefore, it is possible to confirm the presence or absence of pro-eutectoid cementite. As shown in FIG. 8, two diagonal lines 101 are drawn in a square visual field 100 of 200 μm×200 μm. Then, a total sum of the number of pieces of pro-eutectoid cementite that intersect with these two diagonal lines 101 is determined. By dividing the determined total number of pieces of pro-eutectoid cementite by a total length (5.66×100 μm) of the two diagonal lines 101 (that is, based on Formula (1)), the amount of pro-eutectoid θ (pieces/100 μm) is determined. The amounts of pro-eutectoid θ determined at each of the central position of the rim part, the central position of the web part, and the central position of the hub part are held not more than 1.50 pieces/100 μm.

[Average Particle Size of AlN]

Preferably, average particle size of AlN is 150 nm or less in the microstructure of the railway wheel according to the present embodiment. As shown in FIG. 9, if the average particle size of AlN is 150 nm or less, the prior-austenite grain will be refined. Therefore, the toughness of railway wheel will be further improved. The upper limit of the average particle size of AlN is preferably 120 nm, and more preferably 100 nm. Note that the lower limit of the average particle size of AlN is, although not particularly limited, for example, 10 nm.

The average particle size of AlN is determined by observing a carbon-extracted replica sample by TEM-EDS. Specifically, it is determined by the following method. Samples are taken from each of a central position in the thickness direction of the rim pail, a central part in the thickness direction of the web part, and a central position in the thickness direction of the hub part of the railway wheel. The observation surface of the obtained sample is polished. The observation surface after polishing is etched with NITAL solution. Carbon is vapor-deposited on the observation surface after etching. The sample after carbon vapor deposition is immersed in a peeling solution that elutes the base metal alone without dissolving precipitates, causing the replica film to be peeled off from the base metal. In a visual field (6.5 μm×9.0 μm) where a precipitate has been confirmed in the replica film, a photographic image (of the same size as the visual field) is produced by TEM. Further, each precipitate in the photographic image is identified by EDS and electron diffraction image analysis. Among the precipitates, a precipitate which exhibits a characteristic rectangular or hexagonal shape and whose peak in the X-ray intensity spectrum obtained by the EDS measurement appears near the characteristic X-ray energy of Al element (Al Kα radiation: 1.49 keV) is identified as AlN. The area of each identified AlN is determined by using the photographic image, and a circle-equivalent diameter (nm) is determined from the determined area. An average value of determined circle-equivalent diameters is defined as the average particle size (nm) of AlN.

In the railway wheel of the present embodiment, the phrase "the average particle size of AlN is 150 nm or less" means that the average particle size of AlN in the rim part of the railway wheel is 150 nm or less, the average particle size of AlN in the web part is 150 nm or less, and the average particle size of AlN in the hub part is 150 nm or less.

[Microstructure of Railway Wheel]

The microstructure of the rim part, web part, and hub part of the railway wheel of the present embodiment is substantially composed of pearlite. Here, the phrase "substantially composed of pearlite" means that the area fraction of pearlite in the microstructure is 95% or more.

The area fraction of pearlite is determined by the following method. Samples are taken from each of a central position in the thickness direction of the rim part, a central position in the thickness direction of the web part, and a central position in the thickness direction of the huh part of the railway wheel. The observation surface of each sample is mirror-finished by mechanical polishing. Thereafter, the observation surface is etched with NITAL solution (a mixed solution of picnic acid and ethanol). A photographic image is produced for any one visual field (200 μm×200 μm) in the observation surface after etching by using an optical microscope with a magnification of 500. The quenched layer (martensite and/or bainite) and pearlite have different contrasts. Therefore, based on the contrast, the quenched layer and pearlite in the observation surface are identified. The area fraction of pearlite is determined based on a total area of the identified pearlite and the area of the observation surface.

[Production Method of Railway Wheel]

One example of the method for producing the above described railway wheel will be described. This production method includes a step of producing railway wheel steel (starting material production step), a step of forming an intermediate product having a wheel shape from the railway wheel steel by hot working (forming step), a step of performing heat treatment (tread quenching) for the formed intermediate product (heat treatment step), and a step of obtaining a railway wheel by removing the quenched layer by cutting from the tread, etc. of the intermediate product after heat treatment (cutting step). Hereinafter, each step will be described.

[Starting Material Production Step]

In the starting material production step, molten steels having the above described chemical compositions are melted by using an electric furnace or a converter, and thereafter cast to obtain steel ingots. Note that the steel ingot may be either a cast piece by continuous casting, or an ingot cast with a mold.

The cast piece or ingot is subjected to hot working to produce steel materials for railway wheel having a desired size. Examples of hot working include hot forging, hot rolling, and others. According to the production process described so far, steel materials for railway wheel are produced.

Note that the railway wheel steel may be a cast material (cast piece or ingot). That is, the above described hot working step may be omitted. According to the step described above, railway wheel steels which is the starting material of railway wheel are produced.

[Forming Step]

In the forming step, an intermediate product having a wheel shape is formed by hot working by using prepared steel material for railway wheel. Since the intermediate product has a wheel shape, it includes a hub part, a web part, and a rim part including a tread and a flange part. Examples of the hot working include hot forging, and hot rolling.

The heating temperature of the steel material for railway wheel during hot working is preferably 1220° C. or more. In this case, AlN in the steel material for railway wheel sufficiently dissolves in the heating step during hot working. For that reason, fine AlN having an average particle size of 150 nm or less precipitates during heating in the heat treatment step (tread quenching) which is the following step. As a result of this, the prior-austenite grain size is refined to 50 μm or less as shown in FIG. 9, thereby further improving the toughness of railway wheel.

The lower limit of the heating temperature during hot working is preferably 1230° C., more preferably 1250° C., and further preferably 1300° C. The upper limit of the heating temperature during hot working is preferably 1350° C.

Note that, the cooling method of the intermediate product after hot working will not be particularly limited. It may be allowed to cool, or water cooled.

[Heat Treatment Step]

In the heat treatment step, the formed intermediate product having a wheel shape is subjected to tread quenching. Specifically, the intermediate product after hot working (hot forging or hot rolling) is reheated to $A_{cm}$ transformation point or more (reheating treatment). After heating, the tread and the flange part of the intermediate product are subjected to rapid cooling (tread quenching). For example, the tread and the flange part are cooled with a cooling medium. The cooling medium is, for example, air, mist, and steam (spray), and is not particularly limited provided that a cooling rate appropriate to a desired structure can be obtained. Note that at the time of tread quenching, the web part and the hub part are not water cooled, but allowed to cool. In the present embodiment, by setting the Al content in the chemical composition of railway wheel to 0.120 to 0.650%, it is possible to sufficiently suppress formation of pro-eutectoid cementite even if the web part and the hub part are allowed to cool at the time of tread quenching as in the previous production method, and specifically the amount of pro-eutectoid θ can be held not more than 1.50 pieces/100 μm in the rim part, web part, and the hub part.

The diameter of the railway wheel of the present embodiment is, for example, 700 mm to 1000 mm. Moreover, a preferable cooling rate for the tread at the time of tread quenching is 5 to 200° C./sec. Moreover, among the regions of the rim part, the web part, and the hub part of the intermediate product, a preferable cooling rate for the region whose cooling rate is lowest at the time of tread quenching is about 0.1° C./sec. In this case, in the produced railway wheel having the above described chemical composition, the amount of pro-eutectoid θ will be not more than 1.50 pieces/100 μm. A region of the intermediate product whose cooling rate is lowest can be determined, for example, by measuring the change of temperature distribution of the intermediate product during tread cooling by using a plurality of thermographic devices.

As a result of tread quenching, fine pearlite is formed in the outer layer of tread. The C content of the railway wheel of the present embodiment is as high as 0.80 to 1.15%. For that reason, wear resistance of the fine pearlite is enhanced. Further, the Al content of the railway wheel of the present embodiment is as high as 0.120 to 0.650%. For that reason, formation of pro-eutectoid cementite at the time of tread quenching, which cause deterioration of the toughness of steel, is suppressed.

Although the intermediate product is reheated in the above description, the intermediate product after hot working may be directly (without reheating) subjected to tread quenching.

Moreover, in the above description, the web part and the hub part are allowed to cool at the time of tread quenching, when they are allowed to cool, a quenched layer is less likely to be formed on the surfaces of the web part and the hub part. On the other hand, at time of tread quenching, the web part and the hub part may be cooled at a cooling rate more than that when they are allowed to cool. In this case, it is preferable to perform the cooling at a level of cooling rate at which no quenched layer is formed on the surface of the web part and the hub part.

Preferably, after the intermediate product is heated to 1220° C. or more and hot worked, the intermediate product is once cooled. Then, the cooled intermediate product is reheated to not less than the $A_{cm}$ transformation point and subjected to tread quenching. In this case, coarse AlN in steel is caused to dissolve by the heating during hot working, and thereafter precipitates as fine AlN during reheating. Therefore, prior-austenite grain can be refined as described above.

The intermediate product after tread quenching is subjected to tempering as needed. The tempering may be performed at a well-known temperature and time.

[Cutting Step]

As described above, while fine pearlite is formed in the outer layer of the tread of the intermediate product after heat treatment, a quenched layer is formed in the layer thereabove. Since the wear resistance of the quenched layer is poor in uses of railway wheel, the quenched layer is removed by cutting. The cutting may be performed by a well-known method.

The railway wheel of the present embodiment is produced by the above described steps. In the railway wheel produced in the above described production process, the amount of pro-eutectoid θ is not more than 1.50 pieces/100 μm. Therefore, the toughness of the railway wheel is expected to improve. Further, when the heating temperature in the hot working step is set to 1220° C. or more, the average particle size of AlN in steel will become 150 nm or less and prior-austenite grain size will become 50 μm or less. In this case, the toughness of railway wheel will be further enhanced.

EXAMPLES

Example 1

Molten steels of Steel No. 1 to 20 having chemical compositions shown in Table 1 were produced.

[Table 1]

TABLE 1

| Steel No. | Chemical composition (unit is mass %, the balance being Fe and impurities) | | | | | | | | | Quenched layer thickness (mm) | Amount of formed pro-eutectoid cementite (pieces/100 μm) | | Remarks |
| | C | Si | Mn | P | S | Al | N | Cr | V | | Cooling rate 1.0° C./s | Cooling rate 0.1° C./s | |
| --- | --- | --- | --- | --- | --- | --- | --- | --- | --- | --- | --- | --- | --- |
| 1 | 0.93 | 0.29 | 0.80 | 0.001 | 0.002 | 0.032 | 0.0042 | — | — | 9.0 | 0.27 | 1.60 | Comparative steel |
| 2 | 1.00 | 0.30 | 0.80 | 0.001 | 0.002 | 0.034 | 0.0040 | — | — | 10.0 | 2.40 | 4.80 | Comparative steel |

TABLE 1-continued

| | Chemical composition (unit is mass %, the balance being Fe and impurities) | | | | | | | | Quenched layer thickness (mm) | Amount of formed pro-eutectoid cementite (pieces/100 μm) | | |
|---|---|---|---|---|---|---|---|---|---|---|---|---|
| Steel No. | C | Si | Mn | P | S | Al | N | Cr | V | | Cooling rate 1.0° C./s | Cooling rate 0.1° C./s | Remarks |
| 3 | 1.09 | 0.30 | 0.79 | 0.001 | 0.002 | 0.036 | 0.0040 | — | — | 9.0 | 6.14 | 5.07 | Comparative steel |
| 4 | 1.02 | 0.05 | 0.81 | 0.002 | 0.001 | 0.031 | 0.0042 | — | — | 8.0 | 2.13 | 3.47 | Comparative steel |
| 5 | 1.03 | 0.58 | 0.80 | 0.001 | 0.002 | 0.034 | 0.0041 | — | — | 14.0 | 3.20 | 3.47 | Comparative steel |
| 6 | 1.03 | 0.89 | 0.80 | 0.001 | 0.002 | 0.036 | 0.0040 | — | — | 14.0 | 3.74 | 3.20 | Comparative steel |
| 7 | 1.04 | 0.29 | 0.40 | 0.002 | 0.001 | 0.030 | 0.0056 | — | — | 8.0 | 2.13 | 2.93 | Comparative steel |
| 8 | 1.02 | 0.31 | 1.23 | 0.002 | 0.001 | 0.030 | 0.0058 | — | — | 12.0 | 3.20 | — | Comparative steel |
| 9 | 1.05 | 0.29 | 0.79 | 0.001 | 0.001 | 0.033 | 0.0030 | 0.11 | — | 8.0 | 2.40 | 2.93 | Comparative steel |
| 10 | 1.03 | 0.29 | 0.78 | 0.001 | 0.001 | 0.034 | 0.0034 | 0.21 | — | 8.0 | 4.00 | 4.00 | Comparative steel |
| 11 | 1.03 | 0.29 | 0.79 | 0.001 | 0.001 | 0.063 | 0.0041 | — | — | 9.0 | 2.93 | 2.93 | Comparative steel |
| 12 | 1.03 | 0.29 | 0.80 | 0.001 | 0.001 | 0.100 | 0.0044 | — | — | 10.0 | 2.67 | 2.93 | Comparative steel |
| 13 | 1.03 | 0.29 | 0.80 | 0.001 | 0.001 | 0.200 | 0.0046 | — | — | 9.0 | 0.27 | 1.33 | Inventive steel |
| 14 | 1.00 | 0.29 | 0.81 | 0.001 | 0.002 | 0.300 | 0.0034 | — | — | 10.0 | 0.00 | 0.27 | Inventive steel |
| 15 | 1.00 | 0.30 | 0.80 | 0.001 | 0.002 | 0.610 | 0.0034 | — | — | 17.5 | 0.00 | 0.27 | Inventive steel |
| 16 | 0.99 | 0.30 | 0.81 | 0.002 | 0.002 | 0.190 | 0.0045 | — | 0.03 | 11.0 | 0.53 | 1.33 | Inventive steel |
| 17 | 1.03 | 0.29 | 0.80 | 0.002 | 0.001 | 0.029 | 0.0048 | — | 0.03 | 11.0 | 2.13 | — | Comparative steel |
| 18 | 1.03 | 0.29 | 0.80 | 0.002 | 0.001 | 0.026 | 0.0047 | — | 0.09 | 15.0 | 2.40 | — | Comparative steel |
| 19 | 0.97 | 0.26 | 0.76 | 0.002 | 0.001 | 0.190 | 0.0043 | 0.08 | — | 11.0 | 0.27 | 1.33 | Inventive steel |
| 20 | 1.06 | 0.78 | 0.76 | 0.002 | 0.001 | 0.150 | 0.0041 | — | — | 17.5 | 2.40 | 2.93 | Comparative steel |

A round ingot (a truncated cone shape having an upper face diameter of 107 mm, a bottom face diameter of 97 mm, and a height of 230 mm) was produced by an ingot-making process by using the above described molten steel. Simulating the hot working step in the production process of railway wheel, the ingot was heated to 1250° C. and thereafter was hot forged to produce a round bar having a diameter of 40 mm.

[Simulated Tread Quenching Test]

A simulated tread quenching test which simulates tread quenching in the production process of railway wheel was conducted to investigate the amount of pro-eutectoid θ after the simulated tread quenching test.

[Measurement Test of Amount of Pro-Eutectoid θ]

A heat treatment test specimen having a diameter of 3 mm and a length of 10 mm was fabricated from a D/4 position ("D" indicates the diameter of round bar) of each round bar of Steel Nos. 1 to 15. The longitudinal direction of the heat treatment test specimen corresponded to the direction of center axis of the round bar.

A continuous cooling test was conducted using the fabricated heat treatment test specimens. A Formaster tester manufactured by Fuji Electronic Industrial Co., Ltd was used for the heat treatment. Specifically, two test specimens of each steel number were prepared and held at 950° C. for 5 minutes. Thereafter, one of the test specimens was cooled at a constant cooling rate of 1.0° C./sec. The other one of the test specimens was cooled at a constant cooling rate of 0.1° C./sec. The amount of pro-eutectoid θ was determined by the following method for each test specimen after cooling.

A sample having a cross section perpendicular to the longitudinal direction of the heat treatment test specimen as an observation surface was fabricated. On the observation surface, the amount of pro-eutectoid θ was measured by the following method. After the observation surface was mechanically polished, the observation surface was etched with a mixed solution of picnic acid and sodium hydroxide. A photographic image was produced for any one visual field (200 μm×200 μm) in the observation surface after etching by using an optical microscope with a magnification of 500. Based on the contrast, pro-eutectoid cementite in the observation visual field was confirmed. When pro-eutectoid cementite was observed, the amount of pro-eutectoid θ was calculated by the above described method.

[Quenched Layer Depth Measurement Test]

Further, the Jominy end-quench test was conducted regarding the depth of the quenched layer. The Jominy end-quench test was conducted in the following way. A Jominy test specimen having a diameter of 25 mm and a length of 100 mm was fabricated from a round bar having a diameter of 40 mm of each steel number. The center axis of the Jominy test specimen corresponded to the center axis of the round bar. A Jominy end-quench test conforming to JIS G0561 (2011) was conducted using the Jominy test specimen. Specifically, the Jominy test specimen was held in a furnace of 950° C. which is a temperature not less than the $A_{cm}$ transformation point in the atmosphere for 30 minutes, to turn the structure of the Jominy test specimen into a single phase of austenite. Thereafter, end-quenching (water cooling) was performed. Specifically, water was sprayed to one end of the Jominy test specimen to cool it.

After water cooling, a side face of the Jominy test specimen which had been subjected to water cooling was mechanically polished and a Rockwell hardness (HRC) test using the C scale conforming to JIS Z 2245 (2011) was conducted at a constant spacing in the axial direction from the one end (water cooling end) to obtain HRC distribution. The measurement spacing of HRC was arranged at a pitch of 1.0 mm to a position of 15 mm from the water cooling end, and at a pitch of 2.5 mm to a position of not less than 15 mm from the water cooling end. From the obtained HRC distribution, the quenched layer thickness was determined by the following method.

FIG. 17 is a diagram to illustrate HRC distribution (Jominy curve) of Steel Nos. 1 to 3. Referring to FIG. 17, in the Jominy curve, as the distance D from the water cooling end increases, Rockwell hardness HRC rapidly decreases. Then, when D becomes a predetermined distance or more, Rockwell hardness HRC does not decrease so much even when the distance from the water cooling end increases. A region A in which Rockwell hardness HRC rapidly decreases is defined as a "quenched layer", and a region B in which Rockwell hardness HRC does not decrease so much is defined as a "base metal". The region A and the region B can be sectioned via an inflection point. A quenched layer thickness (mm) was determined by identifying the region A from the HRC distribution (Jominy curve) of each Steel number.

Note that a microstructure observation test was conducted in the method described above in FIGS. 2 to 7 on a Jominy test specimen of each steel number after Jominy end-quench test to determine an area fraction of pearlite in the microstructure in a region in which no quenched layer was formed. Specifically, a sample was taken from a portion corresponding to the region B of FIG. 17 of the Jominy test specimen of each steel number. The observation surface of each sample was mirror finished by mechanical polishing. Thereafter, the observation surface was etched with NITAL solution (mixed solution of nitric acid and ethanol). A photographic image was produced for any one visual field (200 μm×200 μm) in the observation surface after etching by using an optical microscope with a magnification of 500. Pearlite in the observation surface was identified based on contrast. The area fraction of pearlite was determined based on a total area of the identified pearlite and the area of the observation surface.

[Test Results]

Test results are shown in Table 1. Referring to Table 1, the microstructure in a region other than the quenched layer was structure substantially composed of pearlite in any steel number. That is, the area fraction of pearlite was 95% or more.

Further, the chemical compositions of Steel Nos. 13 to 16, and 19 were appropriate. For that reason, the amount of pro-eutectoid θ was not more than 1.50 pieces/100 μm at both cooling rates of 0.1° C./sec and 1.0° C./sec. Therefore, it was expected that excellent toughness be obtained. Note that the Al content was 0.350% or less in Steel Nos. 13, 14, 16, and 19. For that reason, while the quenched layer thickness in Steel No. 15 in which the Al content was 0.610% was 17.5 mm, the quenched layer thickness in Steel Nos. 13, 14, 16, and 19 was as small as 11.0 mm or less.

On the other hand, in Steel Nos. 1 to 12, 17, and 18, the Al content was too low. As a result, the amount of pro-eutectoid θ was more than 1.50 pieces/100 μm.

In Steel No. 10, the Si content was too high. As a result, the amount of pro-eutectoid θ was more than 1.50 pieces/100 μm.

Example 2

A round ingot (a truncated cone shape having an upper face diameter of 107 mm, a bottom face diameter of 97 mm, and a height of 230 mm) was produced by an ingot-making process by using the molten steel having the chemical composition of Steel No. 14 in Table 1. The ingot was heated to 1250° C. and thereafter was hot forged to produce a plurality of round bars having a diameter of 40 mm. The produced round bars were used as the test specimens.

Referring to FIG. 10, for the specimens, a hot-forging simulated heating step (STEP 1) was performed simulating the production process of a railway wheel. In this occasion, in each test specimen, the holding temperature in a furnace was 1150° C. (HP1), 1200° C. (HP2), 1250° C. (HP3), and 1300° C. (HP4). The in-furnace atmosphere was argon gas atmosphere, and holding time was 60 minutes for each test specimen. The test specimen was allowed to cool after elapse of the holding time.

After the hot-forging simulated heating step, a tread quenching simulated step (STEP 2) was performed. In the tread quenching simulated step, every test specimen was held at an in-furnace temperature of 950° C. for 20 minutes. After elapse of the holding time, water quenching (WQ) was performed.

[AlN Average Particle Size Measurement Test]

For each of the test specimen after STEP 1 and before STEP 2, and the test specimen after STEP 2, average particle size of AlN was determined. Specifically, a sample was taken from a central position of a cross section perpendicular to the longitudinal direction of the test specimen. The observation surface of the taken sample was polished. The observation surface after polishing was etched with NITAL solution. Carbon was vapor-deposited on the observation surface after etching. The sample after carbon vapor deposition was immersed in a peeling solution to elute the base metal alone without dissolving precipitates, causing the replica film to be peeled off from the base metal. In any visual field (6.5 μm×9 μm) in the replica film, a photographic image (of the same size as the visual field) was produced by TEM. Further, elements in each precipitate in the photographic image were identified by EDS. The area of the identified each AlN was determined, and a circle-equivalent diameter (nm) was determined from the determined area. An average value of the determined circle-equivalent diameters was defined as an average particle size (nm) of AlN.

[Prior-Austenite Grain Size Measurement Test]

Figure 11:
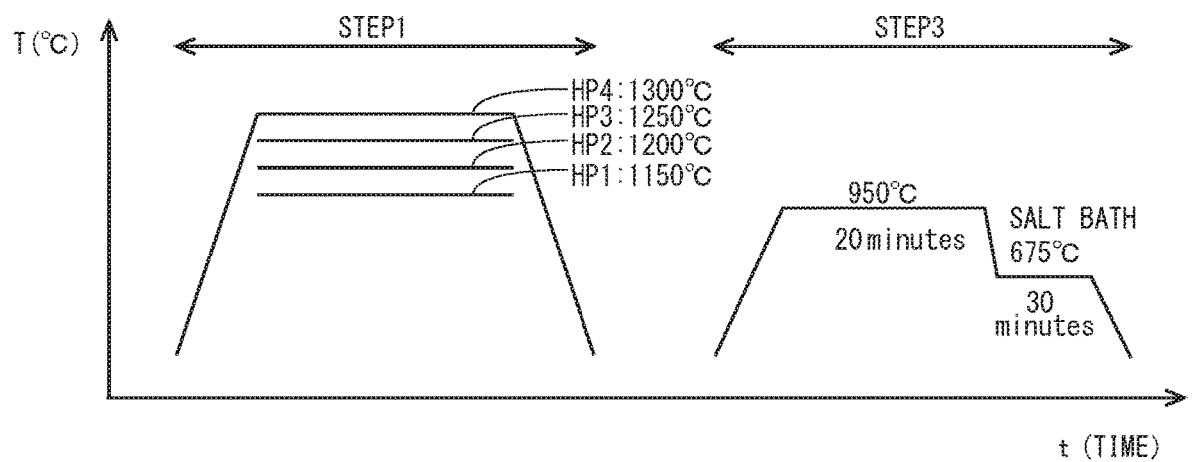
FIG. 11 is a schematic diagram for illustrating heat patterns of a hot-forging simulated heating step (STEP 1) and a tread quenching simulated step (STEP 3), which simulate the production process of railway Wheel different from FIG. 10.

The test specimen having the chemical composition of Steel No. 14 in Table 1 was subjected to the hot-forging simulated heating step (STEP 1) and the tread quenching simulated step (STEP 3) shown in FIG. 11. The hot-forging simulated heating step (STEP 1) of FIG. 11 was the same as the hot-forging simulated heating step (STEP 1) of FIG. 10. In the tread quenching simulated step (STEP 3) of FIG. 11, a test specimen of 950° C. was immersed in a salt bath of 675° C. and was isothermally maintained at 675° C. for 30 minutes. This causes pro-eutectoid cementite to precipitate at grain boundaries of prior-austenite, enabling that prior-austenite grain be confirmed in the microstructure observation. The test specimen after being isothermally maintained was allowed to cool to a room temperature (25° C.).

A sample was taken from a central position of a cross section perpendicular to the longitudinal direction of the test specimen after being allowed to cool. The observation surface of the taken sample was polished. The observation surface after polishing was etched with a mixed solution of picnic acid and sodium hydroxide. In any visual field (200 μm×200 μm) of the etched observation surface, a photographic image (of the same size as the visual field) was produced by TEM. In the produced photographic image, prior-austenite grains were identified. A crystal grain surrounded by pro-eutectoid cementite was identified as prior-austenite grain.

The grain size of the prior-austenite identified in the visual field was determined by an intercept method. Specifically, as shown in FIG. 8, two diagonal lines 101 were drawn in a visual field of a square visual field 100 of 200 μm×200 μm. Then, a total sum of the number of pieces of pro-eutectoid cementite that intersect with the two diagonal lines 101 was determined. Then, a prior-austenite grain size was determined by the following Formula.

Prior-austenite grain size=a total length of two diagonal lines 101 (566 μm)/a total number of pieces of pro-eutectoid cementite which intersect with the diagonal line 101.

[Charpy Impact Test]

A plurality of Charpy test specimens (10 mm×10 mm×55 mm) having the chemical composition of Steel No. 14 in Table 1 were prepared. These test specimens were subjected to the hot-forging simulated heating step (STEP 1) and the tread quenching simulated step (STEP 4) shown in FIG. 15, The hot-forging simulated heating step (STEP 1) of FIG. 15 was the same as the hot-forging simulated heating step (STEP 1) of FIGS. 10 and 11. The tread quenching simulated step (STEP 4) of FIG. 15 was set assuming that the test specimen was cooled at a cooling rate at which the rim part is cooled in the tread quenching of an actual railway wheel. Specifically, in the tread quenching simulated step (STEP 4) of FIG. 15, the test specimen after being held at 950° C. for 20 minutes was immersed in a salt bath of 400° C., and was isothermally maintained at 400° C. for 10 minutes. Then, the test specimen after being isothermally maintained was allowed to cool to a room temperature (25° C.). Using the Charpy test specimens, which were subjected to the heat treatments of STEP 1 and STEP 4 as described above, a Charpy impact test conforming to JIS Z 2242 (2005) was conducted at a room temperature (25° C.).

[Test Results]

FIG. 12 is a diagram to illustrate the average particle size of A N with respect to each hot-forging simulated heating temperature (HP1 to HP4) in a test specimen after the hot-forging simulated heating step (STEP 1) and before the tread quenching simulated step (STEP 2). FIG. 13 is a diagram to illustrate the average particle size of AlN with respect to each hot-forging simulated heating temperature (HP1 to HP4) in a test specimen after the tread quenching simulated step (STEP 2). FIG. 14 is a diagram to illustrate the prior-austenite grain size with respect to each hot-forging simulated heating temperature (HP1 to HP4) in a test specimen after the tread quenching simulated step (STEP 3). FIG. 16 is a diagram to illustrate Charpy impact test values (J/cm$^2$) with respect to each hot-forging simulated heating temperature (HP1 to HP4) in a test specimen after the tread quenching simulated step (STEP 4), FIG. 9 is a diagram to illustrate the relationship between the average particle size of AlN and the prior-austenite grain size based on the results of FIGS. 13 and 14.

Referring to FIGS. 12 and 13, when the hot-forging simulated heating temperature was 1200° C., or less, AlN did not fully dissolve, and much of AlN was extant even after the hot-forging simulated heating (STEP 1) (FIG. 12). For that reason, a large number of coarse AlN remained, and the average particle size was more than 150 nm, thus remaining as coarse as ever even after the heating (FIG. 13) of the tread quenching simulated step (STEP 2).

In contrast to this, when the hot-forging simulated heating temperature was more than 1200° C., the AlN residual amount (FIG. 12) after the hot-forging simulated heating step decreased, and when more than 1250° C., all of AlN dissolved. Then, if the hot-forging simulated heating temperature was more than 1200° C., a large number of fine AlN precipitated, resulting in an average particle size of 150 nm or less after the heating of the tread quenching simulated step (FIG. 13).

Referring to FIG. 9, as the average particle size of AlN decreased, the prior-austenite grain size decreased as well. Then, when the average particle size of AlN was 150 nm or less, the prior-austenite grain size was sufficiently refined to 50 μm or less. Then, referring to FIG. 16, as the average particle size of AlN decreased, the Charpy impact value increased, and when the average particle size of AlN was 150 nm or less, the Charpy impact value was 10 J/cm$^2$ revealing that further excellent toughness can be obtained as the railway wheel.

Embodiments of the present invention have been described so far. However, the above described embodiments are merely examples for practicing the present invention. Therefore, the present invention will not be limited to the above described embodiments, and the present invention can be practiced by appropriately modifying the above described embodiments within a range not departing from the spirit thereof.

REFERENCE SIGNS LIST

1 Railway wheel
2 Hub part
3 Web part
4 Rim part
41 Tread
42 Flange

The invention claimed is:

1. A railway wheel, comprising a chemical composition consisting of: in mass %,
   C: 0.80 to 1.15%,
   Si: 0.45% or less,
   Mn: 0.10 to 0.85%,
   P: 0.050% or less,
   S: 0.030% or less,
   Al: 0.120 to 0.650%,
   N: 0.0030 to 0.0200%,
   Cr: 0 to 0.25%, and
   V: 0to 0.12%, with
   the balance being Fe and impurities, wherein
   an area fraction of pearlite in a microstructure of the railway wheel is not less than 95%, and
   an amount of pro-eutectoid cementite, which is defined by Formula (1), in the microstructure of the railway wheel is not more than 1.50 pieces/100 μm:
   Amount of pro-eutectoid cementite (pieces/100 μm)=a total sum of the number of pieces of pro-eutectoid cementite which intersect with two diagonal lines in a square visual field of 200 μm×200 μm/(5.66×100 μm) (1),
   further comprising AlN particles in the microstructure wherein
   an average particle size of the AlN particles present in the microstructure is 150 nm or less.

2. The railway wheel according to claim 1, wherein the Al in the chemical composition is between 0.120 to 0.350% in mass %.

3. The railway wheel according to claim 1, wherein one or more of the Cr and V in the chemical composition is between, in mass %:
   Cr: 0.02 to 0.25%, and
   V: 0.02 to 0.12%.

4. The railway wheel according to claim 1, wherein a prior-γ grain size present in the railway wheel is 50 μm or less.

5. The railway wheel according to claim 2, wherein one or more of the Cr and V in the chemical composition is between, in mass %:
   Cr: 0.02 to 0.25%, and
   V: 0.02 to 0.12%.

* * * * *